(12) United States Patent
Portail et al.

(10) Patent No.: US 11,967,097 B2
(45) Date of Patent: Apr. 23, 2024

(54) SYSTEM AND METHOD FOR CHANGE ANALYSIS

(71) Applicant: Cape Analytics, Inc., Palo Alto, CA (US)

(72) Inventors: Matthieu Portail, Palo Alto, CA (US); Christopher Wegg, Palo Alto, CA (US); Fabian Richter, Palo Alto, CA (US)

(73) Assignee: CAPE ANALYTICS, INC., Palo Alto, CA (US)

( * ) Notice: Subject to any disclaimer, the term of this patent is extended or adjusted under 35 U.S.C. 154(b) by 0 days.

(21) Appl. No.: 18/141,033

(22) Filed: Apr. 28, 2023

(65) Prior Publication Data

US 2023/0267634 A1    Aug. 24, 2023

Related U.S. Application Data

(63) Continuation of application No. 18/074,295, filed on Dec. 2, 2022, now Pat. No. 11,676,298.

(60) Provisional application No. 63/350,124, filed on Jun. 8, 2022, provisional application No. 63/290,174, filed on Dec. 16, 2021.

(51) Int. Cl.
| | |
|---|---|
| *G06T 7/60* | (2017.01) |
| *G06V 10/74* | (2022.01) |
| *G06V 10/764* | (2022.01) |
| *G06V 20/17* | (2022.01) |

(52) U.S. Cl.
CPC .............. *G06T 7/60* (2013.01); *G06V 10/761* (2022.01); *G06V 10/764* (2022.01); *G06V 20/17* (2022.01); *G06T 2207/30184* (2013.01)

(58) Field of Classification Search
CPC . G06T 2207/10032; G06T 2207/20081; G06T 2207/30184; G06T 7/20; G06T 7/60; G06V 10/761; G06V 10/764; G06V 20/17
See application file for complete search history.

(56) References Cited

U.S. PATENT DOCUMENTS

| | | | |
|---|---|---|---|
| 5,633,946 | A | 5/1997 | Lachinski et al. |
| 6,044,171 | A | 3/2000 | Polyakov et al. |
| 6,249,616 | B1 | 6/2001 | Hashimoto |
| 7,327,902 | B2 | 2/2008 | Ritt et al. |
| 7,873,238 | B2 | 1/2011 | Schultz et al. |

(Continued)

FOREIGN PATENT DOCUMENTS

| | | |
|---|---|---|
| CN | 101549596 B | 8/2012 |
| CN | 108197583 A | 6/2018 |

(Continued)

OTHER PUBLICATIONS

Ambrosch, Philipp , et al., "System and Method for Property Group Analysis", U.S. Appl. No. 18/333,803, filed Jun. 13, 2023.

(Continued)

*Primary Examiner* — Manuchehr Rahmjoo
(74) *Attorney, Agent, or Firm* — Jeffrey Schox; Diana Lin

(57) ABSTRACT

In variants, the method for change analysis can include detecting a rare change in a geographic region by comparing a first and second representation, extracted from a first and second geographic region measurement sampled at a first and second time, respectively, using a common-change-agnostic model.

7 Claims, 29 Drawing Sheets

(56) References Cited

U.S. PATENT DOCUMENTS

| | | |
|---|---|---|
| 7,945,117 B2 | 5/2011 | Hermosillo et al. |
| 8,078,436 B2 | 12/2011 | Pershing et al. |
| 8,081,841 B2 | 12/2011 | Schultz et al. |
| 8,145,578 B2 | 3/2012 | Pershing et al. |
| 8,170,840 B2 | 5/2012 | Pershing |
| 8,207,964 B1 | 6/2012 | Meadow et al. |
| 8,209,152 B2 | 6/2012 | Pershing |
| 8,401,222 B2 | 3/2013 | Thornberry et al. |
| 8,452,125 B2 | 5/2013 | Schultz et al. |
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,548,248 B2 | 10/2013 | Mitchell et al. |
| 8,655,070 B1 | 2/2014 | Yang et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,760,285 B2 | 6/2014 | Billman et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,965,812 B2 | 2/2015 | Linville |
| 8,977,520 B2 | 3/2015 | Stephens et al. |
| 8,995,757 B1 | 3/2015 | Ciarcia et al. |
| 9,117,310 B2 | 8/2015 | Coene et al. |
| 9,129,376 B2 | 9/2015 | Pershing |
| 9,135,737 B2 | 9/2015 | Pershing |
| 9,141,880 B2 | 9/2015 | Ciarcia |
| 9,141,925 B2 | 9/2015 | Jung et al. |
| 9,147,287 B2 | 9/2015 | Ciarcia |
| 9,159,130 B2 | 10/2015 | Kneepkens |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,389,084 B1 | 7/2016 | Chen et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,536,148 B2 | 1/2017 | Gross |
| 9,542,738 B2 | 1/2017 | Schultz et al. |
| 9,576,201 B2 | 2/2017 | Wu et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,042 B1 | 3/2018 | Cardona et al. |
| 9,911,228 B2 | 3/2018 | Pershing et al. |
| 9,922,412 B1 | 3/2018 | Freeman et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,002,415 B2 | 6/2018 | Shen et al. |
| 10,169,680 B1 | 1/2019 | Sachdeva et al. |
| 10,197,391 B2 | 2/2019 | Thornberry et al. |
| 10,229,532 B2 | 3/2019 | Freund et al. |
| 10,311,302 B2 | 6/2019 | Kottenstette et al. |
| 10,338,222 B2 | 7/2019 | Schultz et al. |
| 10,346,935 B2 | 7/2019 | Thornberry et al. |
| 10,402,676 B2 | 9/2019 | Wang et al. |
| 10,430,902 B1 | 10/2019 | Rawat et al. |
| 10,453,147 B1 | 10/2019 | Davis |
| 10,455,197 B2 | 10/2019 | Giuffrida et al. |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2 | 1/2020 | Okazaki |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,839,469 B2 | 11/2020 | Pershing |
| 10,937,178 B1 | 3/2021 | Srinivasan |
| 10,943,464 B1 | 3/2021 | Hayward et al. |
| 11,037,255 B1 | 6/2021 | Ganev et al. |
| 11,210,552 B2 | 12/2021 | Kossyk et al. |
| 11,267,265 B2 | 3/2022 | Maehira |
| 11,367,265 B2 | 6/2022 | Vianello et al. |
| 11,631,235 B2 | 4/2023 | Vianello et al. |
| 11,651,552 B2 | 5/2023 | Valladolid et al. |
| 11,861,843 B2 | 1/2024 | Portail et al. |
| 2003/0146913 A1 | 8/2003 | Shen et al. |
| 2004/0153330 A1 | 8/2004 | Miller et al. |
| 2005/0084178 A1 | 4/2005 | Lure et al. |
| 2005/0154657 A1 | 7/2005 | Kim et al. |
| 2006/0165267 A1 | 7/2006 | Wyman et al. |
| 2008/0133319 A1 | 6/2008 | Adiga et al. |
| 2008/0255862 A1 | 10/2008 | Bailey et al. |
| 2010/0014781 A1 | 1/2010 | Liu et al. |
| 2010/0111428 A1 | 5/2010 | Yu et al. |
| 2010/0217566 A1 | 8/2010 | Wayne et al. |
| 2012/0005109 A1 | 1/2012 | Stinson |
| 2012/0141014 A1 | 6/2012 | Lepikhin et al. |
| 2012/0265675 A1 | 10/2012 | Lawrence |
| 2013/0006676 A1 | 1/2013 | Helitzer et al. |
| 2013/0054476 A1 | 2/2013 | Whelan |
| 2013/0121571 A1 | 5/2013 | Gokturk et al. |
| 2014/0015924 A1 | 1/2014 | Pryor |
| 2014/0139515 A1 | 5/2014 | Kim et al. |
| 2014/0180989 A1 | 6/2014 | Krizhevsky et al. |
| 2015/0088886 A1 | 3/2015 | Brouwer et al. |
| 2015/0131852 A1 | 5/2015 | Sweetser et al. |
| 2015/0186953 A1 | 7/2015 | Gross |
| 2015/0187015 A1 | 7/2015 | Adams et al. |
| 2015/0242747 A1 | 8/2015 | Packes et al. |
| 2015/0269598 A1 | 9/2015 | Terrazas et al. |
| 2015/0286786 A1 | 10/2015 | El-Baz et al. |
| 2015/0302529 A1 | 10/2015 | Jagannathan |
| 2015/0347872 A1 | 12/2015 | Taylor et al. |
| 2016/0026900 A1 | 1/2016 | Ando |
| 2016/0027051 A1 | 1/2016 | Gross |
| 2016/0048934 A1 | 2/2016 | Gross |
| 2016/0063516 A1 | 3/2016 | Terrazas et al. |
| 2016/0092959 A1 | 3/2016 | Gross |
| 2016/0162986 A1 | 6/2016 | Ghosh |
| 2016/0292800 A1 | 10/2016 | Smith |
| 2017/0032481 A1 | 2/2017 | Dsouza et al. |
| 2017/0270650 A1 | 9/2017 | Howe et al. |
| 2017/0352099 A1 | 12/2017 | Howe et al. |
| 2017/0357984 A1 | 12/2017 | Takamatsu et al. |
| 2018/0096420 A1 | 4/2018 | Sun et al. |
| 2018/0101917 A1 | 4/2018 | Fujita |
| 2019/0057465 A1 | 2/2019 | Spath |
| 2019/0188516 A1 | 6/2019 | Porter et al. |
| 2019/0213412 A1 | 7/2019 | Kottenstette et al. |
| 2019/0213438 A1 | 7/2019 | Jones et al. |
| 2019/0294647 A1 | 9/2019 | Brouwer et al. |
| 2019/0304026 A1 | 10/2019 | Lyman et al. |
| 2019/0311044 A1 | 10/2019 | Xu et al. |
| 2019/0354772 A1 | 11/2019 | Tasli et al. |
| 2020/0034861 A1 | 1/2020 | Lundgren et al. |
| 2020/0082168 A1 | 3/2020 | Fathi et al. |
| 2020/0134733 A1 | 4/2020 | Maddox et al. |
| 2020/0134753 A1 | 4/2020 | Vickers |
| 2020/0151500 A1 | 5/2020 | Kossyk et al. |
| 2020/0160030 A1 | 5/2020 | Lavi |
| 2020/0226373 A1 | 7/2020 | Kottenstette et al. |
| 2020/0279653 A1 | 9/2020 | Hayward |
| 2020/0348132 A1 | 11/2020 | Du et al. |
| 2021/0065340 A1 | 3/2021 | El-Khamy et al. |
| 2021/0089811 A1 | 3/2021 | Strong |
| 2021/0110439 A1 | 4/2021 | Jayne et al. |
| 2021/0118165 A1 | 4/2021 | Strong |
| 2021/0124850 A1 | 4/2021 | Messervy et al. |

(56) References Cited

U.S. PATENT DOCUMENTS

| | | | |
|---|---|---|---|
| 2021/0133936 A1 | 5/2021 | Chandra et al. | |
| 2021/0151195 A1 | 5/2021 | Hayward | |
| 2021/0182529 A1 | 6/2021 | Singh et al. | |
| 2021/0188312 A1 | 6/2021 | Shikari et al. | |
| 2021/0199446 A1 | 7/2021 | Marschner et al. | |
| 2021/0312710 A1 | 10/2021 | Fathi et al. | |
| 2022/0012518 A1 | 1/2022 | Sutherland | |
| 2022/0012918 A1 | 1/2022 | Kozikowski et al. | |
| 2022/0036486 A1 | 2/2022 | Dhandapani et al. | |
| 2022/0036537 A1 | 2/2022 | Johnson et al. | |
| 2022/0099855 A1* | 3/2022 | Li | G01V 1/345 |
| 2022/0292650 A1 | 9/2022 | Amirghodsi et al. | |
| 2022/0405856 A1 | 12/2022 | Hedges et al. | |
| 2023/0011777 A1 | 1/2023 | Brown et al. | |
| 2023/0119132 A1 | 4/2023 | Cebulski et al. | |
| 2023/0143198 A1 | 5/2023 | Vianello | |
| 2023/0230220 A1 | 7/2023 | Portail et al. | |
| 2023/0230250 A1 | 7/2023 | Manello | |
| 2023/0237775 A1 | 7/2023 | Portail | |

FOREIGN PATENT DOCUMENTS

| | | |
|---|---|---|
| CN | 108629287 A | 10/2018 |
| EP | 3340106 A1 | 6/2018 |
| EP | 4033426 A1 | 7/2022 |
| WO | 2012115594 A1 | 8/2012 |

OTHER PUBLICATIONS

Cebulski, Sarah, et al., "System and Method for Property Analysis", U.S. Appl. No. 18/303,990, filed Apr. 20, 2023.

Corbin, Matthew, et al., "System and Method for Property Data Management", U.S. Appl. No. 18/104,969, filed Feb. 2, 2023.

Zheng, Chuanxia, et al., "Pluralistic Image Completion", arXiv:1903.04227v2. Apr. 5, 2019.

Lee, Xiang, et al., "System and Method for Property Analysis", U.S. Appl. No. 18/303,990, filed Apr. 20, 2023.

"HOA Lookup City of Goodyear GIS", https://www.arcgis.com/apps/webappviewer/index.html?id=816ddfbd119e49d4a74bb30cb4592c22, first downloaded May 31, 2023.

"Cape analytics now detects yard debris from Geospatial imagery", Dec. 18, 2019, pp. 1-4 (Year: 2019).

"CLIP: Connecting Text and Images", https://openai.com/blog/clip/, Jan. 5, 2021.

"Gdal_viewshed", © 1998-2022 Frank Warmerdam, Even Rouault, and others, downloaded Aug. 3, 2021, https://gdal.org/programs/gdal_viewshed.html.

"Geospatial Property Analytics: Supercharging AVMs for SFR Investing", Cape Analytics, downloaded Oct. 3, 2022, https://capeanalytics.com/blog/geospatial-property-analytics-avm-sfr-investing/.

"Hail Risk Assessment Hail Risk Score, Hail Damage Score", Verrisk Analytics, downloaded Oct. 15, 2021, https://www.verisk.com/insurance/products/hail-risk-assessment/.

"Industry-Leading Wildfire Risk Insights", zesty.ai, downloaded Oct. 15, 2021, https://www.zesty.ai/wildfire-risk.

"Manage wildfire risk at the address level", Verisk, downloaded Oct. 15, 2021, https://www.verisk.com/siteassets/media/downloads/underwriting/location/location-fireline.pdf?1=.

"The Real Value of Change Detection: A ChangeFinderTM Story Map", https://www.eagleview.com/newsroom/2018/02/real-value-change-detection/, EagleView US, Feb. 28, 2018.

"Unique Building Identifier (UBID)", Office of Energy Efficiency & Renewable Energy, https://www.energy.gov/eere/buildings/unique-building-identifier-ubid#:~:text=UBID, first downloaded Dec. 22, 2022.

"ValPro+—Cape Analytics", Cape Analytics, https://web.archive.org/web/20210301122341/https://capeanalytics.com/valpro/, downloaded Oct. 3, 2022.

"Weiss Analytics Launches ValPro+, First AVM Powered by Cape Analytics' Instant Property Condition Assessments", Cape Analytics, Feb. 19, 2021, https://capeanalytics.com/resources/weiss-analytics-valpro-instant-property-condition-assessments/.

Ali, Imtiaz, "Unsupervised video analysis for counting of wood in river during floods", Springer-Verlag, 2009, pp. 578-587 (year: 2009).

Arrowsmith, Ellie, et al., "Wildfire Fuel Management and Risk Mitigation", Insurance Institute for Business & Home Safety, zesty.ai, Apr. 2021.

Baranzini, Andrea, et al., "A Sight for Sore Eyes Assessing the value of view and landscape use on the housing market", Publisher:CRAG—Haute ecole de gestion de Genève, Genève, 2007.

Carlberg, Matthew, et al., "Classifying Urban Landscape in Aerial Lidar Using 3D Shape Analysis", IEEE, 978-1-4244-5654-3, 2009, pp. 1701-1704 (Year: 2009).

Chen, Yixing, et al., "Development of city—modeling", Energy and Buildings, 2019, pp. 252-265 (Year 2019).

Dai, Xieer, et al., "Viewshed Effects and House Prices: Estimating a Spatial Hedonic Model", https://alrov.tau.ac.il/wp-content/uploads/2021/08/%D7%93%D7%A0%D7%99%D7%90%D7%9C-%D7%A4%D7%9C%D7%96%D7%A0%D7%A9%D7%98%D7%99%D7%99%D7%9F-2019.pdf, downloaded Aug. 3, 2021.

Eigen, David, et al., "Depth Map Prediction from a Single Image using a Multi-Scale Deep Network", Proceedings of Advances in Neural Information Processing Systems (NIPS), Jun. 2014.

Ermolin, S. V., et al., "Predicting Days-on-Market for Residential Real Estate Sales", (Year: 2016).

Friedland, Carol, et al., "Integrated Aerial-Based and ground Based-Scales", ResearchGate, Feb. 9, 2015, pp. 1-7 (Year. 2015).

Hamaguchi, Ryuhei, et al., "Rare Event Detection using Disentangled Representation Learning", arXiv:1812.01285, submitted Dec. 4, 2018, 2019 IEEE/CVF Conference on Computer Vision and Pattern Recognition (CVPR) Long Beach, CA, USA, Jun. 15-20, 2019.

Jiang, Shasha, et al., "Automatic urban debris zone extraction from post-hurricane very high-resolution satellite and aerial imagery", Geomatics, Natural hazards and Risk, 2016, pp. 933-952 (Year: 2016).

Johnson, et al., "Valuing curb appeal", The Journal of Real Estate Finance and Economics 60 (2020): 111-133. (Year: 2020).

Kalinicheva, Ekaterina, et al., "Unsupervised Change Detection Analysis in Satellite Image Time Series using Deep Learning Combined with Graph-Based Approaches", https://hal.archives-ouvertes.fr/hal-02749683, Jun. 3, 2020.

Kamara, Amadu Fullah, et al., "A hybrid neural network for predicting Days on Market a measure of liquidity in real estate industry", ScienceDirect, Knowledge-Based Systems, 208 (2020) 106417.

Kotova, Nadia, et al., "Liquidity in Residential Real Estate Markets", Apr. 2021, https://anthonyleezhang.github.io/pdfs/sfipd.pdf.

Lee, Jun-Tae, et al., "Image Aesthetic Assessment Based on Pairwise Comparison—A Unified Approach to Score Regression, Binary Classification, and Personalization", 2019 IEEE/CVF International Conference on Computer Vision (ICCV), Oct. 27, 2019-Nov. 2, 2019.

Liu, et al., "Learning multi-instance deep ranking and regression network for visual house appraisal", IEEE Transactions on Knowledge and Data Engineering 30.8 (2018): 1496-1506. (Year: 2018).

Maire, Frederic, et al., "A Convolutional Neural Network for Automatic Analysis of Aerial Imagery", 2014 International Conference on Digital Image Computing: Techniques and Applications (DICTA), 8 pages (2014).

Mansouri, Babak, "Earthquake building damage detection using VHR Satellite data", Case study; Two villages near Sarpol-e Zahab), JSEE, Jul. 29, 2018, pp. 45-55 (Year: 2018).

Moussa, A., et al., "Man-made objects classification from satellite/aerial imagery using neural networks", International Archives of the Photogrammetry, Remote Sensing and Spatial Information Sciences—ISPRS Archives, 4 pages (2010).

Muhs, Sebastian, "Automatic delineation—maps", ELSEVIER, 2016, p. 71-84 (Year: 2016).

(56) References Cited

OTHER PUBLICATIONS

Neptune, Nathalie, et al., "Automatic Annotation of Change Detection Images", Sensors, published Feb. 5, 2021.

Plank, Simon, "Rapid damage—Sentinel", Remote Sensing, May 28, 2014, pp. 4870-4906 (Year 2014).

Poursaeed, Omid, et al., "Vision-based Real Estate Price Estimation", arXiv:1707.05489 [cs.CV], https://doi.org/10.48550/arXiv.1707.05489, Machine Vision and Applications, 29(4), 667-676, 2018.

Radford, Alec, et al., "Learning Transferable Visual Models From Natural Language Supervision", arXiv:2103.00020v1 [cs.CV] Feb. 26, 2021.

Tran, Kieu, "Applying Segmentation and Neural Networks to Detect and Quantify Marine Debris From Aerial w Images Captured by an Unmanned Aerial System and Mobile Device", Aug. 2018, pp. 1-70 (Year 2018).

Urbis, Arvydas, et al., "GIS-Based Aesthetic Appraisal of Short-Range Viewsheds of Coastal Dune and Forest Landscapes", Forests 2021, 12, 1534. https://doi.org/10.3390/f12111534.

Wang, Jianjun, et al., "Generating Viewsheds without Using Sightlines", Photogrammetric Engineering & Remote Sensing, vol. 66 No. 1, Jan. 2000, pp. 87-90.

Wang, Xuenting, et al., "Predicting the Attractiveness of Real-Estate Images by Pairwise Comparison using Deep Learning", 2019 IEEE International Conference on Multimedia & Expo Workshops (ICMEW), Shanghai, China, 2019, pp. 84-89, doi: 10.1109/ICMEW.2019.0-106.

Yu, Bailang, et al., "Automated derivation—method", Landscape and urban planning, 2020, pp. 210-219 (Year: 2010).

Zhu, Hengshu, et al., "Days on Market: Measuring Liquidity in Real Estate Markets", KDD '16, Aug. 13-17, 2016, San Francisco, CA, USA.

\* cited by examiner

SYSTEM AND METHOD FOR CHANGE ANALYSIS

CROSS-REFERENCE TO RELATED APPLICATIONS

This application is a continuation of U.S. application Ser. No. 18/074,295 filed 2 Dec. 2022, which claims the benefit of U.S. Provisional Application No. 63/290,174 filed 16 Dec. 2021, and U.S. Provisional Application No. 63/350,124 filed 8 Jun. 2022, each of which is incorporated in its entirety by this reference.

TECHNICAL FIELD

This invention relates generally to the property change field, and more specifically to a new and useful system and method in the property change field.

DETAILED DESCRIPTION

The following description of the embodiments of the invention is not intended to limit the invention to these embodiments, but rather to enable any person skilled in the art to make and use this invention.

1. Overview

Figure 1A:
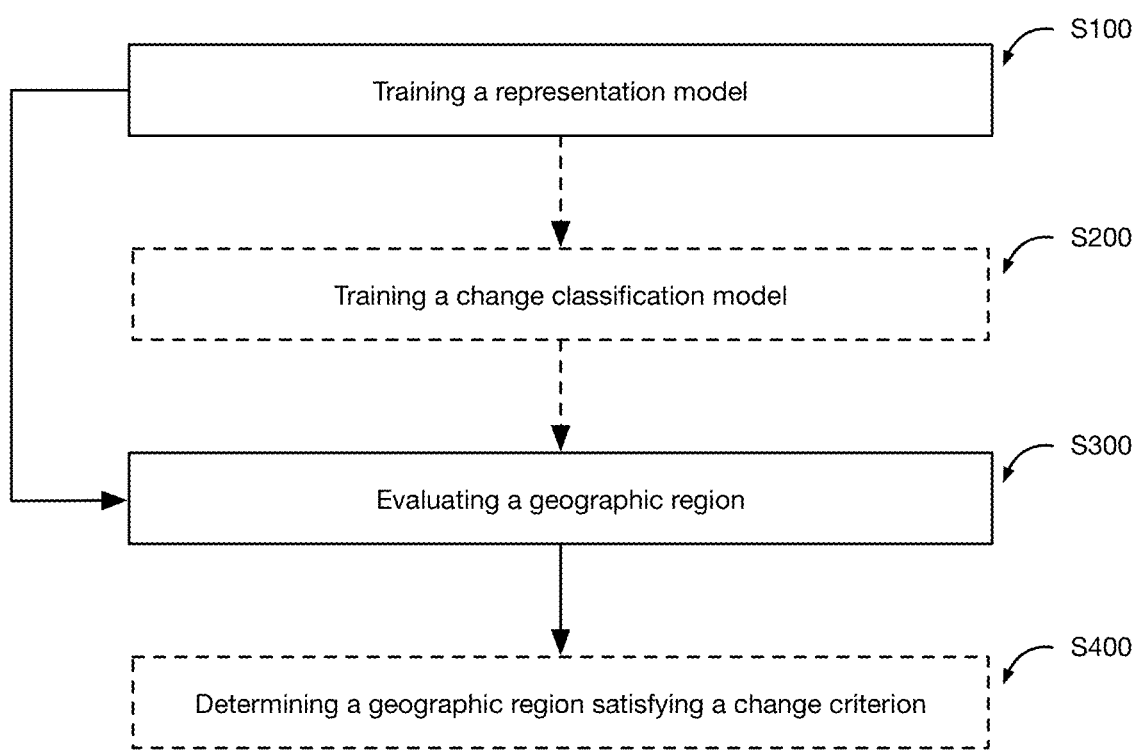
FIG. 1A is a flowchart representation of a variant of the method.

As shown in FIG. 1A, the method for change analysis can include: training a representation model S100 and evaluating a geographic region S300. However, the method can additionally or alternatively include any other suitable elements.

The method functions to detect rare changes (e.g., caused by disaster, house fire, remodeling, etc.) for a given geographic region (e.g., property, address, geocoordinates, point of interest, geographic location, etc.). In variants, the method can additionally or alternatively generate a common-change-agnostic model (e.g., wherein the method trains a model to be agnostic to common changes, such that rare changes can be more accurately detected), generate a baseline common-change-agnostic representation for a geographic region (e.g., baseline appearance-based representation for the geographic region), train a change classification model, identify one or more geographic regions associated with a change type and/or any other change information, and/or perform other functionalities.

2. Examples

In an example, the method can include: determining a baseline vector representative of a geographic region based on a baseline image of said geographic region from a first timestamp using a common-change-agnostic model; determining a test vector of the geographic region based on a test image of said geographic region from a different timestamp using the common-change-agnostic model; detecting a rare change when the test vector differs from the baseline vector (e.g., differs beyond a threshold value); and optionally classifying the rare change using a change classification model. In this example, the common-change-agnostic model can be trained (e.g., using self-supervised learning) based on a set of training images, wherein the common-change-agnostic model is trained to output the same vector for each image of the same geographic region. The set of training images can include a set of heterogeneous images of each geographic region. For example, the set of training can include images depicting common changes (e.g., depicting the same, substantially unchanged geographic region under different visual conditions, such as different lighting, shadows, obstructions, etc.). The set of training images can optionally include and/or exclude images of the geographic region depicting rare changes (e.g., depicting property damage, property construction, etc.). However, rare changes to a given geographic region can be otherwise detected.

3. Technical Advantages

Variants of the technology can confer one or more advantages over conventional technologies.

Figure 12:
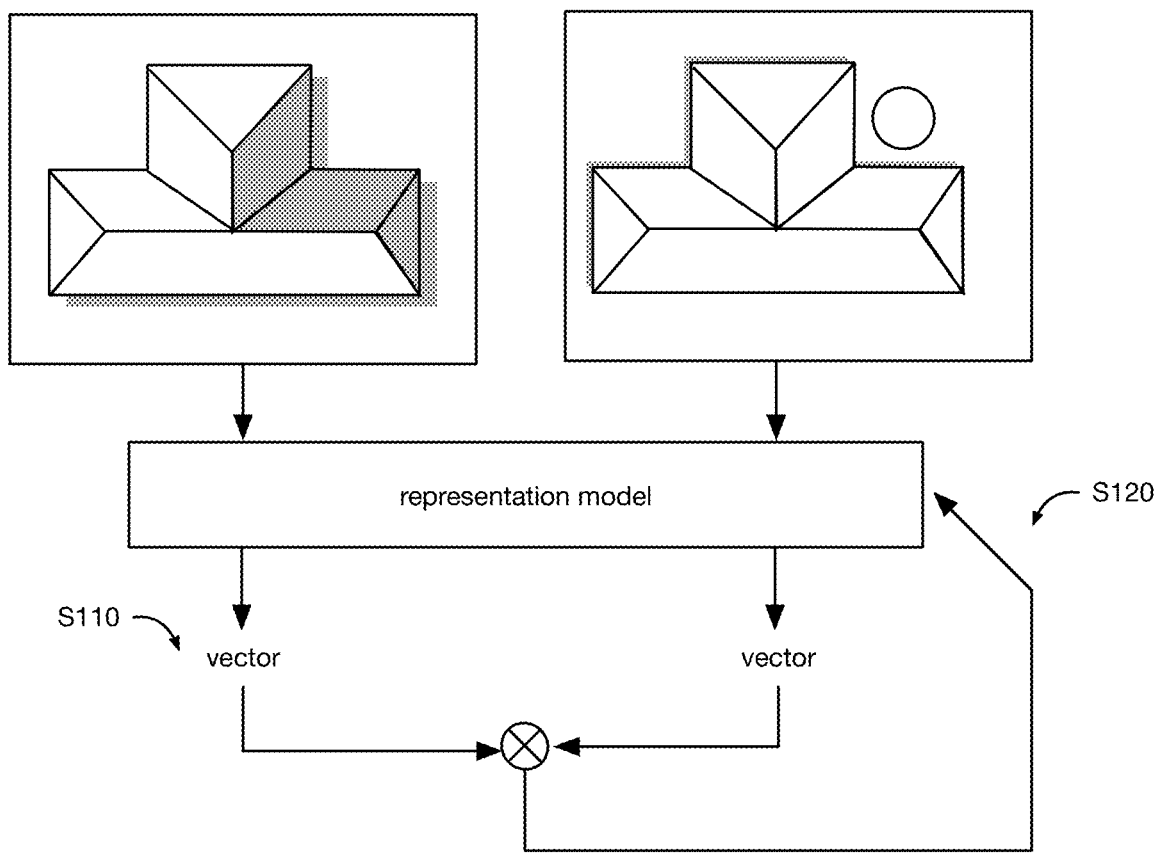
FIG. 12 is a fifth illustrative example of training a representation model.
Figure 13:
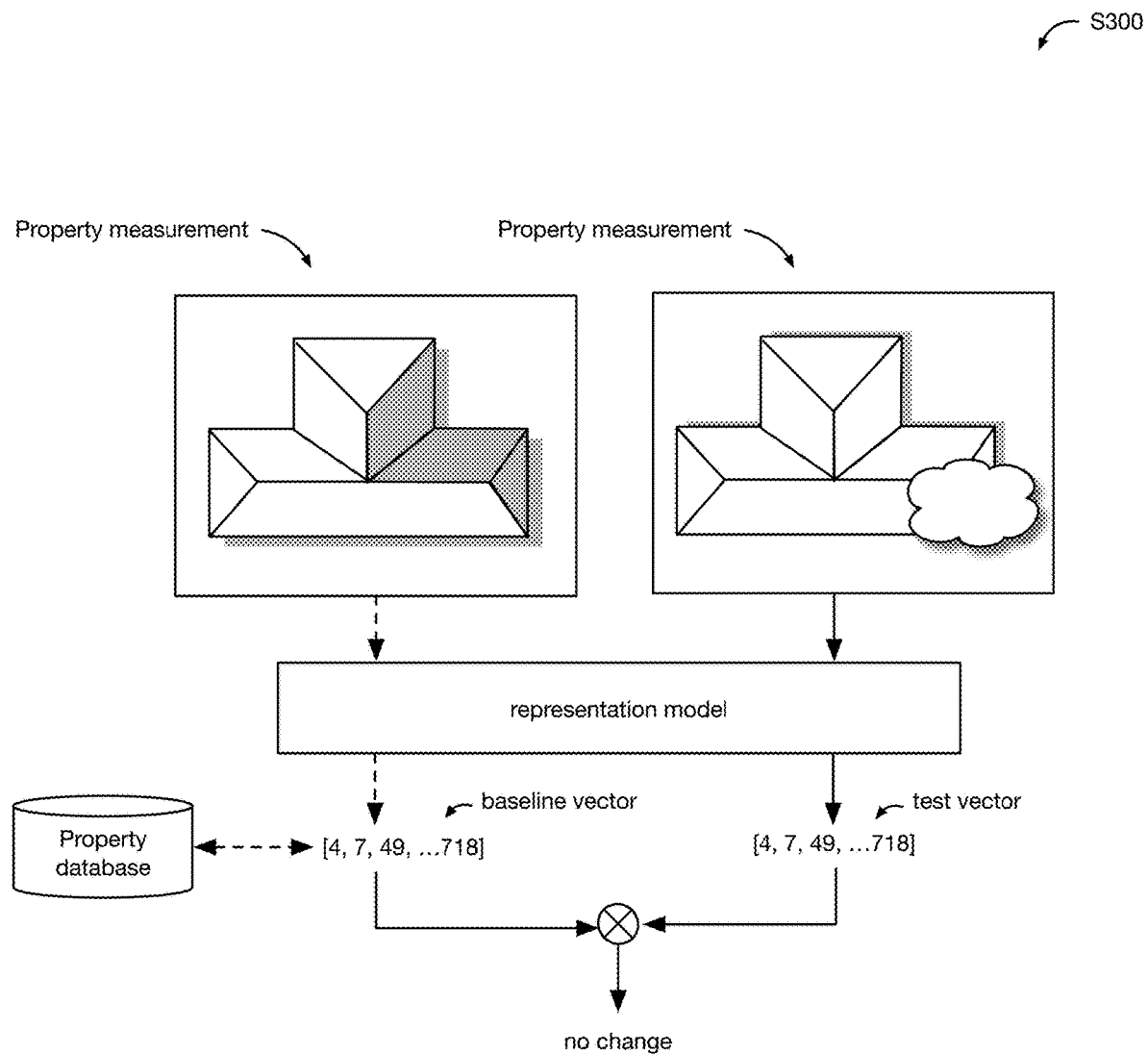
FIG. 13 is an illustrative example of determining that no geographic region change occurred.
Figure 14:
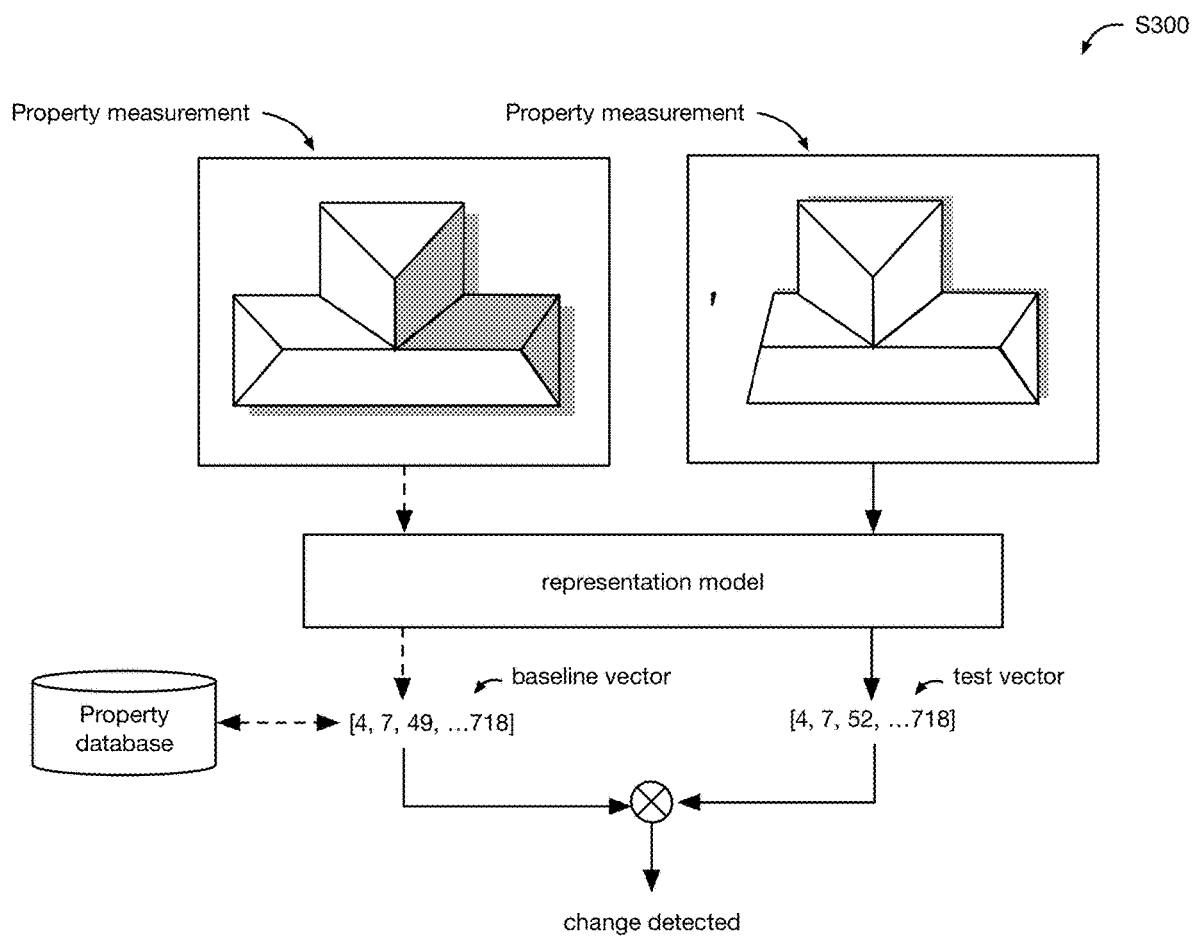
FIG. 14 is an illustrative example of determining that a geographic region change has occurred.

First, the technology can detect rare changes (e.g., caused by disaster, house fire, remodeling, etc.) to a geographic region while being agnostic to common changes (e.g., caused by shadows, tree occlusions, car presence, seasons, planes, clouds, different measurement providers, different sensing modalities, etc.). The inventors have discovered that a comprehensive common change taxonomy is difficult to build, which makes it difficult to train machine learning models to comprehensively detect or ignore every individual common change. This technology enables a common-change-agnostic model to be trained, such that rare changes can be more easily detected. For example, this technology can train a representation model to output the substantially same representation (e.g., the same feature vector) from different images—depicting different common changes—of the same geographic region (examples shown in FIG. 12 and FIG. 13), such that a rare change event can be detected when a different representation is output for said geographic region (example shown in FIG. 14).

Second, the technology can determine the type of change (e.g., change type) and when the change occurred (e.g., change time) at the geographic region. For example, the technology can use a search method (e.g., binary search) through the timeseries of images for a given geographic region to identify when the change occurred.

Third, variants of the technology can enable machine learning models to be trained using representation learning and/or self-supervised learning. This can overcome the challenges of sparse data (e.g., since measurements of the geographic region may be taken infrequently) with limited or no availability of ground-truth labels.

Fourth, variants of the technology can leverage visual features (e.g., appearance-based features) instead of geometric features when evaluating whether a change has occurred. The inventors have discovered that, in some situations, geometric features extracted from remote measurements (e.g., remote imagery) using appearance-based methods can be highly susceptible to common changes and remote measurement errors (e.g., during geo-registration process), and that, surprisingly, visual features can be more robust to said common changes and remote measurement errors. This can be particularly useful when comparing measurements from different modalities (e.g., aerial and satellite imagery of the same property), which oftentimes depict common changes (e.g., due to georegistration discrepancy, atmospheric effects, misalignment, etc.) even if sampled contemporaneously. However, geometric features can additionally or alternatively be used (e.g., the common-change-agnostic model can be trained to extract the same geometric feature vector given different geometric measurements for a given geographic region).

Fifth, variants of the technology can store the representations instead of the measurements, which can minimize the amount of storage necessary to store a timeseries of data for a given geographic region.

Sixth, variants of the technology can increase the computational efficiency of evaluating a large dataset of geographic regions (e.g., identifying and classifying rare changes for each geographic region, identifying one or more geographic regions in the dataset that experienced a given rare change type, etc.). In an example, the dataset of geographic regions can be filtered to identify geographic regions that have experienced a rare change, such that a downstream change classification can be performed for the filtered subset of geographic regions instead of the unfiltered dataset.

However, further advantages can be provided by the system and method disclosed herein.

4. System

Figure 1B:
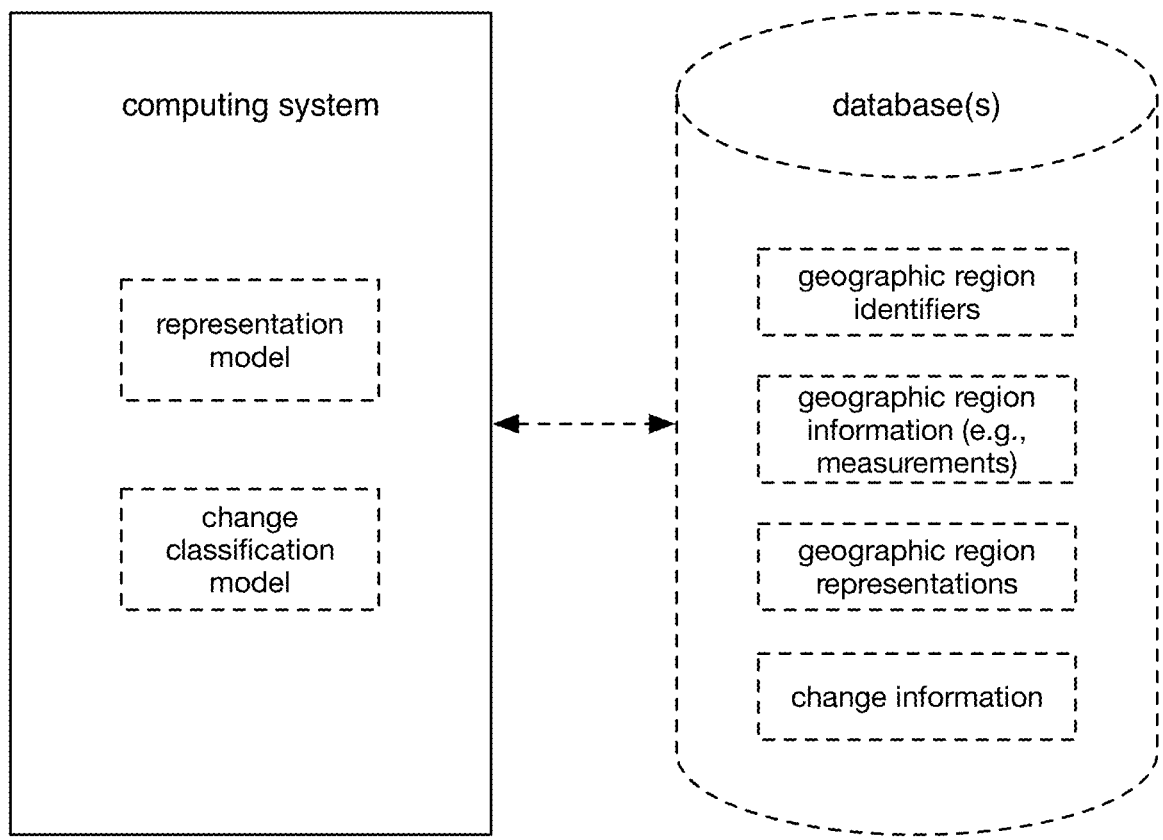
FIG. 1B is a schematic representation of a variant of the system.

As shown in FIG. 1B, the system can include one or more representation models, change classification models, and/or any other set of models. The system can optionally include a computing system, a database, and/or any other suitable components. In variants, the system can function to detect rare changes for a given geographic region, to train one or more models (e.g., a change-agnostic model), generate a baseline, common-change-agnostic representation for a geographic region, to identify one or more geographic regions, store geographic region information, receive requests, and/or perform other functionalities.

The system can be used with one or more geographic regions. The geographic regions can function as test geographic regions (e.g., a geographic region of interest), training geographic regions (e.g., used to train one or more models), and/or be otherwise used.

Each geographic region can be or include: a property, a point of interest, a land (e.g., a parcel, land region, etc.), a region boundary (e.g., property parcel, neighborhood, zip code, census block group, city, state, etc.), a landmark, a geographic region component or set or segment thereof, and/or otherwise defined. A property can: include both the underlying land and improvements (e.g., built structures, fixtures, etc.) affixed to the land, only include the underlying land, or only include a subset of the improvements (e.g., only the primary building). Geographic region components can include: built structures (e.g., primary structure, accessory structure, deck, pool, etc.); subcomponents of the built structures (e.g., roof, siding, framing, flooring, living space, bedrooms, bathrooms, garages, foundation, HVAC systems, solar panels, slides, diving board, etc.); permanent improvements (e.g., pavement, statutes, fences, etc.); temporary improvements or objects (e.g., trampoline); vegetation (e.g., tree, flammable vegetation, lawn, etc.); land subregions (e.g., driveway, sidewalk, lawn, backyard, front yard, wildland, etc.); debris; and/or any other suitable component. The geographic regions and/or components thereof are preferably physical, but can alternatively be virtual.

Each geographic region can be identified by one or more geographic region identifiers. A geographic region identifier (geographic region ID) can include: geographic coordinates, geocode, an address, a parcel identifier, property identifier, a block/lot identifier, a planning application identifier, a municipal identifier (e.g., determined based on the ZIP, ZIP+4, city, state, etc.), and/or any other identifier. The geographic region identifier can be used to retrieve geographic region information, such as parcel information (e.g., parcel boundary, parcel location, parcel area, etc.), geographic region measurements, geographic region descriptions, and/or other geographic region data. The geographic region identifier can additionally or alternatively be used to identify a geographic region component, such as a primary building or secondary building, and/or be otherwise used.

Each geographic region can be associated with geographic region information. The geographic region information can be static (e.g., remain constant over a threshold period of time) or variable (e.g., vary over time). The geographic region information can be associated with: a time (e.g., a generation time, a valid duration, etc.), a source (e.g., the information source), an accuracy or error, and/or any other suitable metadata. The geographic region information is preferably specific to the geographic region, but can additionally or alternatively be from other geographic regions (e.g., neighboring geographic regions, other geographic regions sharing one or more attributes with the geographic region). Examples of geographic region information can include: measurements, descriptions, representations (e.g., baseline representation, appearance feature vectors, etc.), attributes, auxiliary data, and/or any other suitable information about the geographic region.

Geographic region measurements preferably measure an aspect about the geographic region, such as a visual appearance, geometry, and/or other aspect. In variants, when the geographic region includes a property, the geographic region measurements can depict the property (e.g., the property of interest), but can additionally or alternatively depict the surrounding region, adjacent properties, and/or other factors. The measurement can be: 2D, 3D, and/or have any other set of dimensions. Examples of measurements can include: images, surface models (e.g., digital surface models (DSM), digital elevation models (DEM), digital terrain models (DTM), etc.), polygons, point clouds (e.g., generated from LIDAR, RADAR, stereoscopic imagery, etc.), depth maps, depth images, virtual models (e.g., geometric models, mesh models), audio, video, radar measurements, ultrasound measurements, and/or any other suitable measurement. Examples of images that can be used include: RGB images, hyperspectral images, multispectral images, black and white images, grayscale images, panchromatic images, IR images, NIR images, UV images, NDVI images, thermal images, and/or images sampled using any other set of wavelengths; images with depth values associated with one or more pixels (e.g., DSM, DEM, etc.); and/or other images.

The measurements can include: remote measurements (e.g., aerial imagery, satellite imagery, balloon imagery, drone imagery, radar, sonar, Light Detection and Ranging (LIDAR), seismography, etc.), local or on-site measurements (e.g., sampled by a user, streetside measurements, etc.), and/or sampled at any other proximity to the geographic region. The remote measurements can be measurements sampled more than a threshold distance away from the geographic region (e.g., from a geographic region component), such as more than 100 ft, 500 ft, 1,000 ft, any range therein, and/or sampled any other distance away from the geographic region. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the geographic region. The measurements can depict a geographic region exterior, a geographic region interior, and/or any other view of the geographic region.

Figure 11:
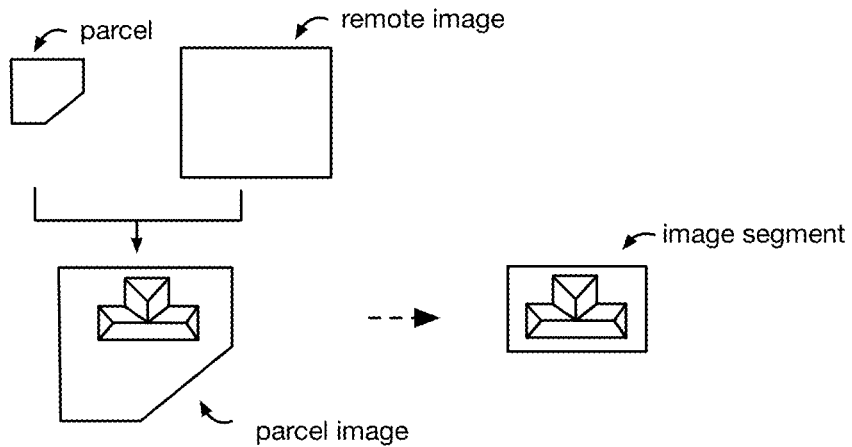
FIG. 11 is an illustrative example of determining an image segment for a geographic region.

The measurements can be a full-frame measurement, a segment of the measurement (e.g., the segment depicting the geographic region, such as that depicting the geographic region's parcel; the segment depicting a geographic region a predetermined distance away from the geographic region; etc.), a merged measurement (e.g., a mosaic of multiple measurements), orthorectified, and/or otherwise processed. The measurements can include tiles (e.g., of geographic regions), chips (e.g., of a built structure), parcel segments (e.g., of a property parcel), and/or any other suitable segments. The property can optionally be associated with a parcel (e.g., property parcel), wherein the parcel can be used to identify the segment of a larger-scale measurement depicting the property (example shown in FIG. 11), or otherwise used.

The measurements can be sampled (e.g., measured, acquired, etc.) at a measurement time. The measurements can be received as part of a user request, retrieved from a database, determined using other data (e.g., segmented from an image, generated from a set of images, etc.), synthetically determined, and/or otherwise determined. The measurements can be from the same measurement provider (e.g., vendor) or from different measurement providers (e.g., retrieved from different provider databases).

The geographic region information can include geographic region descriptions. The geographic region description can be: a written description (e.g., a text description), an audio description, and/or in any other suitable format. The geographic region description is preferably verbal but can alternatively be nonverbal. Examples of geographic region descriptions can include: listing descriptions (e.g., from a realtor, listing agent, etc.), property disclosures, inspection reports, permit data, change descriptions, appraisal reports, and/or any other text based description of a geographic region.

The geographic region information can include auxiliary data. Examples of auxiliary data can include the geographic region descriptions, permit data, insurance loss data, inspection data, appraisal data, broker price opinion data, valuations, geographic region attribute and/or component data (e.g., values), historical weather and/or hazard data, measurement context (e.g., measurement acquisition pose, measurement provider, measurement time, sensing modality, obstructions, etc.), and/or any other suitable data.

However, the geographic region information can include any other suitable information about the geographic region.

Each geographic region can optionally be associated with a set of geographic region attributes, which function to represent one or more aspects of a given geographic region. The geographic region attributes can be semantic, quantitative, qualitative, and/or otherwise describe the geographic region. Each geographic region can be associated with its own set of geographic region attributes, and/or share geographic region attributes with other geographic regions. As used herein, geographic region attributes can refer to the attribute parameter (e.g., the variable) and/or the attribute value (e.g., value bound to the variable for the geographic region).

Geographic region attributes can include: geographic region components, features (e.g., feature vector, mesh, mask, point cloud, pixels, voxels, any other parameter extracted from a measurement), any parameter associated with a geographic region component (e.g., geographic region component characteristics), semantic features (e.g., whether a semantic concept appears within the geographic region information), and/or higher-level summary data extracted from geographic region components and/or features. Geographic region attributes can be determined based on geographic region information for the geographic region itself, neighboring properties, and/or any other set of properties. Geographic region attributes can be automatically determined (e.g., using a model), manually determined, and/or otherwise determined.

Geographic region attributes can include: structural attributes, condition attributes, record attributes, semantic attributes, subjective attributes, and/or any other suitable set of attributes. In a specific example, when the geographic region is a property, the geographic region attributes for the property can include a property class. Property classes can include a residential property (e.g., single-family house, multi-family house, apartment building, condo, etc.), a commercial property (e.g., industrial center, forest land, farmland, quarry, etc.), and/or any other suitable property class. Examples of geographic region attributes can include: location, structure size, structure footprint, roof geometry (e.g., slope, facets, etc.), roof material, yard debris, vegetation coverage, and/or any other suitable attribute.

In examples, geographic region attributes and/or values thereof can defined and/or determined as disclosed in U.S. application Ser. No. 17/529,836 filed on 18 Nov. 2021, U.S. application Ser. No. 17/475,523 filed 15 Sep. 2021, U.S. application Ser. No. 17/749,385 filed 20 May 2022, U.S. application Ser. No. 17/870,279 filed 21 Jul. 2022, and/or U.S. application Ser. No. 17/858,422 filed 6 Jul. 2022, each of which is incorporated in its entirety by this reference (e.g., wherein features and/or feature values disclosed in the references can correspond to attributes and/or attribute values).

Each geographic region can optionally be associated with one or more representations (e.g., geographic region representations). The representation is preferably representative of a visual appearance of the geographic region, but can alternatively be representative of the geometry of the geographic region, or represent any other set of attributes and/or features of the geographic region. The representation is preferably a vector (e.g., feature vector), but can additionally or alternatively be an array, a set, a matrix, a map, an embedding, an encoding, a multidimensional surface, a single value, and/or any other suitable representation. The representation can be any shape (e.g., of any dimension). The representation preferably includes values for nonsemantic features, but can additionally or alternatively include values for semantic features (e.g., attribute values) and/or any other information. The representation is preferably extracted using a representation model, but can additionally or alternatively be determined by the user, retrieved from a database, and/or otherwise determined.

A geographic region can experience one or more common changes, rare changes, and/or no changes.

Common changes are preferably temporary and/or transient changes to the appearance of the geographic region (e.g., last less than a day, last less than a year, are not structural changes to or within the geographic region, etc.), but can alternatively be permanent. Common changes (e.g., common differences) can be caused by the environment (e.g., shadows, tree occlusions, seasons, clouds, birds, light glare, weather, sun angle, etc.), be manmade (e.g., car and/or other vehicle presence, planes, repainting, decorations, temporary structures, etc.), be caused by obstructions, be due to the data source (e.g., different measuring entities, different sensing modalities, different post-processing steps, different measurement acquisition poses relative to the geographic region, other differing measurement contexts, etc.), and/or otherwise created. Obstructions can include environmental obstructions (e.g., clouds, shadows, trees, tree leaves, bushes, other plants, light glare, etc.), manmade obstructions (e.g., car, planes, other vehicles, decorations, temporary structures, etc.), orthorectification errors, and/or any other visual obstructions of the geographic region. Temporary structures can include tents, event structures, portable/mobile toilets, trampolines, playsets, and/or any other temporary and/or mobile structures. Measurement acquisition pose can include measurement acquisition angle relative to the geographic region, position relative to the geographic region (e.g., location, distance from the geographic region, etc.), and/or any other geometric relationship. Common changes can be changes (e.g., appearance changes, geometric changes, measurement changes) that occur in: more than a threshold proportion of the measurements (e.g., more than 30%, 50%, 60%, 70%, 80%. 90% 95%, 99%, etc. of the measurements), more than a threshold proportion of the geographic regions (e.g., more than 30%, 50%, 60%, 70%, 80%. 90% 95%, 99%, etc. of the geographic), and/or at more than a threshold frequency (e.g., more frequently than once a day, week, month, year, 2 years, 5 years, 10 years, etc.), and/or be otherwise defined.

Rare changes are preferably permanent changes (e.g., structural changes, long-term changes, semi-permanent changes, etc.), but can alternatively be temporary and/or transient. Rare changes preferably occur for less than a threshold percentage of geographic regions in a given time window (e.g., wherein the time window can be 1 day, 1 week, 1 month, 1 year, 2 years, 5 years, 10 years, etc.), but can alternatively occur with any other frequency. The threshold percentage of geographic regions (e.g., properties) can be between 0.001%-30% or any range or value therebetween (e.g., 0.005%, 0.01%, 0.05%, 0.1%, 0.5%, 1%, 2%, 5%, 10%, 15%, 20%, 30%, etc.), but can alternatively be less than 0.001% or greater than 30%. For a dataset including pairs of measurements (each pair corresponding to a geographic region), rare changes are preferably depicted in less than a threshold percentage of the measurement pairs, but alternatively can be depicted at any frequency. The threshold percentage of measurement pairs can be between 0.001%-30% or any range or value therebetween (e.g., 0.005%, 0.01%, 0.05%, 0.1%, 0.5%, 1%, 2%, 5%, 10%, 15%, 20%, 30%, etc.), but can alternatively be less than 0.001% or greater than 30%.

Rare changes can be caused by a disaster and/or weather (e.g., hail, wildfire, tornadoes, storm, hurricane, earthquake, flooding, drought, etc.), be man-made (e.g., demolition, construction, renovation, etc.), and/or be otherwise caused. A disaster is preferably an environmental disaster (e.g., earthquake, hurricane, etc.) and/or widespread disaster (e.g., that encompass more than one geographic region), but can additionally or alternatively be a manmade disaster (e.g., a house fire), property-specific disaster (e.g., a house fire), and/or any other suitable disaster. Rare changes can include a property damage event (e.g., house fire, house flood, robbery, vandalization, etc.), property loss event, property construction event (e.g., remodeling, roof repair, auxiliary structure addition and/or removal, built structure footprint change, etc.), property demolition event, and/or any other suitable rare change.

A change (e.g., rare change and/or common change) can optionally be associated with change information. Examples of change information elements include: a change type (e.g., change classification), change extent, change magnitude, change time (e.g., a time when the change event occurred, a time range during which the change event occurred, etc.), change cost (e.g., cost to repair a property damage event), change occurrence (e.g., a probability that a given geographic region experienced the change event), change cause, change description (e.g., one or more longform text descriptions and/or other text labels corresponding to the change type), change uncertainty, any other change characteristic, and/or any other change information.

Change types can include a natural change type (e.g., related to a change in a tree, a body of water, vegetation, etc.), an artificial change type (e.g., related to a change in a house, a building, a roof, a pool, a driveway, a shed, etc.), any/or any other suitable change type classification.

Change information can be numerical (e.g., 0 vs. 1), categorical/multiclass (e.g., low change, medium change, high change), binary (e.g., change has occurred vs. change has not occurred), non-binary (e.g., 1, 2, 3, 4, 5), discrete, continuous, and/or otherwise structured.

Models in the system (e.g., the representation model, the change classification model, etc.) can be or use one or more of: regression (e.g., leverage regression), classification (e.g., binary classifiers, multiclass classifiers, semantic segmentation models, instance-based segmentation models, etc.), neural networks (e.g., CNNs, DNNs, encoders, etc.), rules, heuristics (e.g., inferring the number of stories of a property based on the height of a property), equations (e.g., weighted equations, etc.), selection and/or retrieval (e.g., from a database and/or library), instance-based methods (e.g., nearest neighbor), regularization methods (e.g., ridge regression), decision trees, Bayesian methods (e.g., Naïve Bayes, Markov, etc.), kernel methods, deterministics, genetic programs, support vectors, optimization methods, statistical methods (e.g., probability), comparison methods (e.g., vector comparison, image comparison, matching, distance metrics, thresholds, etc.), clustering methods (e.g., k-means clustering), principal component analysis, local linear embedding, independent component analysis, unrestricted Boltzmann machines, encoders (e.g., autoencoders, variational autoencoders, regularized autoencoder, concrete autoencoder, etc.), contrastive language-image pre-training (CLIP) models, vision transformers, segmentation algorithms (e.g., neural networks, such as CNN based algorithms, thresholding algorithms, clustering algorithms, etc.), isolation forests, robust random cut forest, object detectors (e.g., CNN based algorithms, such as Region-CNN, fast RCNN, faster R-CNN, YOLO, SSD-Single Shot MultiBox Detector, R-FCN, etc.; feed forward networks, transformer networks, and/or other neural network algorithms), key point extraction, SIFT, any computer vision and/or machine learning method (e.g., CV/ML extraction methods), and/or any other suitable method. The models can be trained, learned, fit, predetermined, and/or can be otherwise determined. The models can be trained using self-supervised learning, semi-supervised learning, supervised learning, unsupervised learning, transfer learning, reinforcement learning, single-shot learning, zero-shot learning, and/or any other suitable training method.

The representation model (e.g., geographic region representation model) can function to extract a representation from a measurement of the geographic region. Inputs to the representation model can include one or more measurements for a geographic region, other geographic region information, auxiliary data (e.g., measurement context data), and/or any other suitable inputs. Outputs from the representation model can include one or more representations for the geographic region and/or any other suitable outputs. In a first example, the representation model receives one measurement and outputs one representation. In a second example, the representation model receives multiple measurements (e.g., two measurements) and outputs one representation (e.g., a common representation). However, the representation model can receive any number of measurements and/or output any number of representations. However, the representation model can be otherwise configured. The representation model is preferably trained using a feature learning method (e.g., supervised learning, unsupervised learning, etc.), but can be otherwise trained. The representation model is preferably a deep learning model, but can alternatively be another model. In examples, the representation model can be an autoencoder, an encoder, a decoder, a Boltzmann machine, and/or be any other suitable model.

Figure 15:
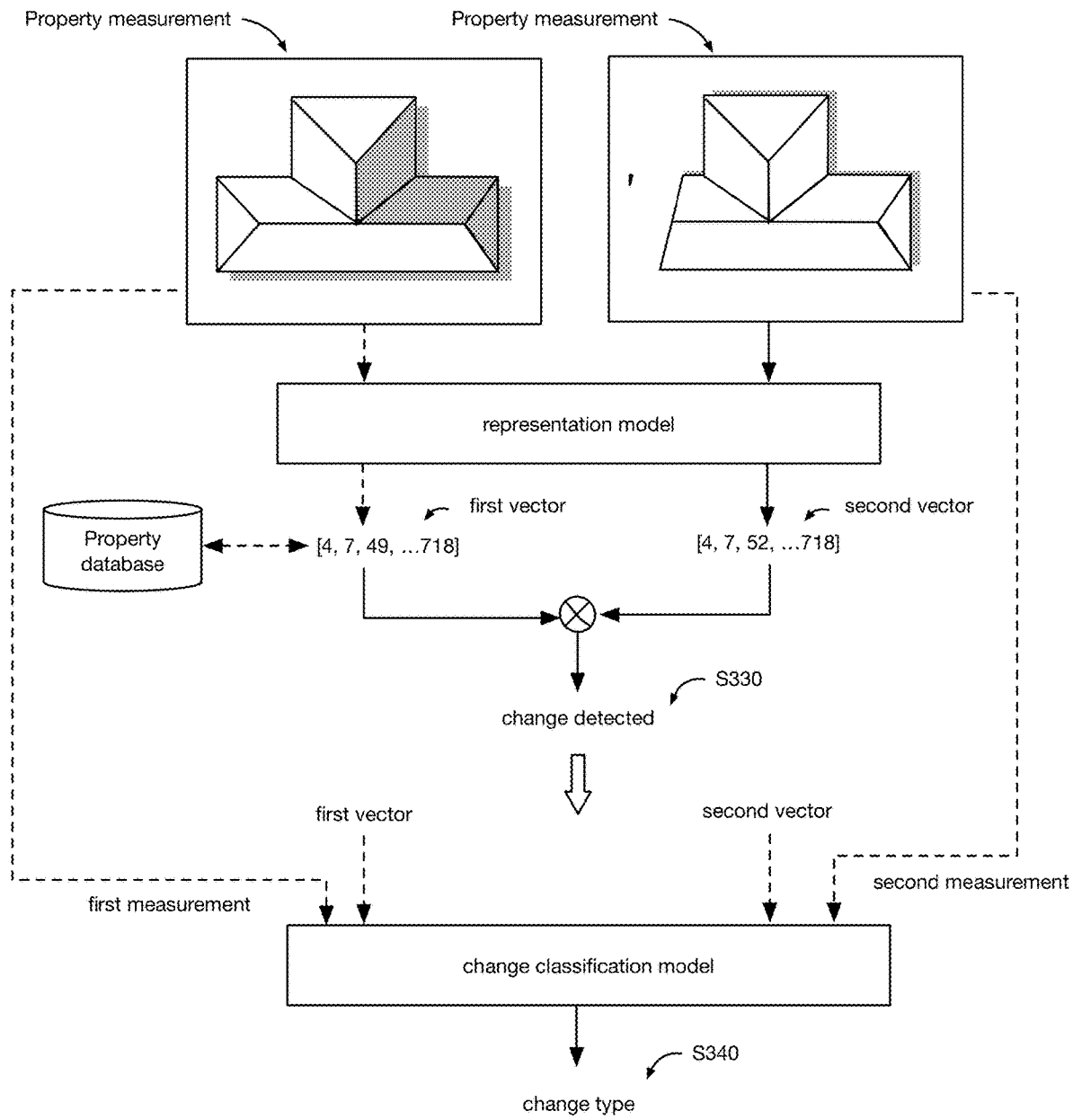
FIG. 15 is an illustrative example of determining a change type.

The optional change classification model can function to classify the type of change (e.g., the type of rare change) depicted across pre-change and post-change measurements (example shown in FIG. 15). Inputs to the change classification model can include geographic region representations (e.g., a pair of representations for a pair of measurements, a single measurement-pair representation for a pair of measurements, etc.), one or more measurements, a comparison metric, change information (e.g., change type, change description, etc.), auxiliary data (e.g., measurement context data), outputs from the representation model, and/or any other suitable inputs. Examples of measurement inputs include: a measurement depicting the geographic region before and/or after a change event, a set (e.g., pair) of measurements spanning the change (e.g., a series of images), and/or any other measurements. Inputs can be determined via user input (e.g., a user specified change type and/or change description of interest, a user specified geographic region, a user specified measurement time, etc.), selected from a database (e.g., select measurements and/or representations corresponding to a geographic region of interest and/or a time of interest), automatically determined (e.g., using the representation model), and/or otherwise determined. Outputs from the change classification model can include a change type (e.g., change classification) and/or change description, a probability (e.g., likelihood) of one or more inputs (e.g., a pair of measurements, a pair of representations, etc.) corresponding to a given change type and/or change description, any other change information, and/or any other suitable outputs. The change classification model can optionally be or include the representation model (e.g., the change classification model is a downstream layer of the representation model), interface with the representation model (e.g., in series, in parallel, etc.), and/or be unrelated to the representation model. However, the change classification model can be otherwise configured.

The system can optionally include a database which can function to store geographic region identifiers, geographic region information (e.g., location, measurements, representations, change information, etc.), and/or any other information. The database can be local, remote, distributed, or otherwise arranged relative to any other system or module. In variants, the database can be or interface with a third-party source (e.g., third-party database, MLS database, city permitting database, historical weather and/or hazard database, tax assessor database, CONUS data, etc.), but can alternatively not interface with a third-party source. For example, information in the database can be retrieved, linked, or otherwise associated with information in a third-party source. The database can optionally be queried (e.g., based on a geographic region identifier, based on change information, etc.) to retrieve measurements, geographic regions, change information, and/or any other information in the database.

The system can optionally include a computing system. The computing system can function to execute all or portions of the method, and/or perform any other suitable functionality. The computing system can be local (e.g., a user device such as a smartphone, laptop, desktop, tablet, etc.), remote (e.g., one or more servers, one or more platforms, etc.), distributed, or otherwise arranged relative to any other system or module. The computing system can include one or more: CPUs, GPUs, custom FPGA/ASICS, microprocessors, servers, cloud computing, and/or any other suitable components. The computing system can be used with a user interface (e.g., mobile application, web application, desktop application, API, database, etc.) or not be used with a user interface. The user interface can optionally be used to receive and/or input: geographic region identifiers, change information (e.g., change classifications, change descriptions, etc.), and/or any other inputs. The user interface can optionally be used to provide and/or output: geographic region identifiers, change information and/or any other outputs. The computing system can optionally interface with the database(s).

5. Method

As shown in FIG. 1A, the method can include: training a representation model S100 and evaluating a geographic region S300, but can additionally or alternatively include any other suitable elements. The method can optionally include: training a change classification model S200, determining a geographic region satisfying a change criterion S400, and/or any other suitable elements.

All or portions of the method can be performed by one or more components of the system, by a user, and/or by any other suitable system. All or portions of the method can be performed automatically, manually, semi-automatically, and/or otherwise performed.

All or portions of the method can be performed in real time, in response to a request from an endpoint, before receipt of a request, iteratively, asynchronously, periodically, and/or at any other suitable time. All or portions of the method can be performed for one geographic region, multiple geographic regions, and/or any other suitable number of geographic regions. All or portions of the method can be performed for all geographic regions within a geographic region set (e.g., all geographic regions appearing in a map, within a larger region, within a large-scale measurement, as a batch, etc.), a single geographic region (e.g., requested location), and/or any other suitable location(s). All or portions of the method can be repeated for different geographic regions, timeframes, and/or otherwise repeated.

Training a representation model S100 functions to train a model to be agnostic to common changes at a geographic region. The representation model can be trained one time, periodically (e.g., daily, weekly, monthly, yearly, etc.), at random times, responsive to a request, responsive to receipt of additional information, and/or any other suitable time frequency. The representation model can be specific to a property (e.g., a property identifier, a parcel identifier, etc.), to a property class (e.g., residential properties, commercial properties, etc.), a geographic region (e.g., by street, by town, by city, by county, by state, by country, a geofence of any geographic region in the world, a geographic identifier, etc.), a settlement class (e.g., urban, suburban, rural, etc.), a rare change type (e.g., object removed, object added, object modified, hail, fire, earthquake, flood, etc.), a season type (e.g., autumn, winter, spring, summer, etc.), a climate type (e.g., tropical rainy, dry, temperate marine, temperate continental, polar, highlands, etc.), and/or be otherwise specific. Additionally or alternatively, the model can be generic across properties, property classes, geographic regions, settlement classes, rare change types, season types, climate types, and/or be otherwise generic.

Figure 2:
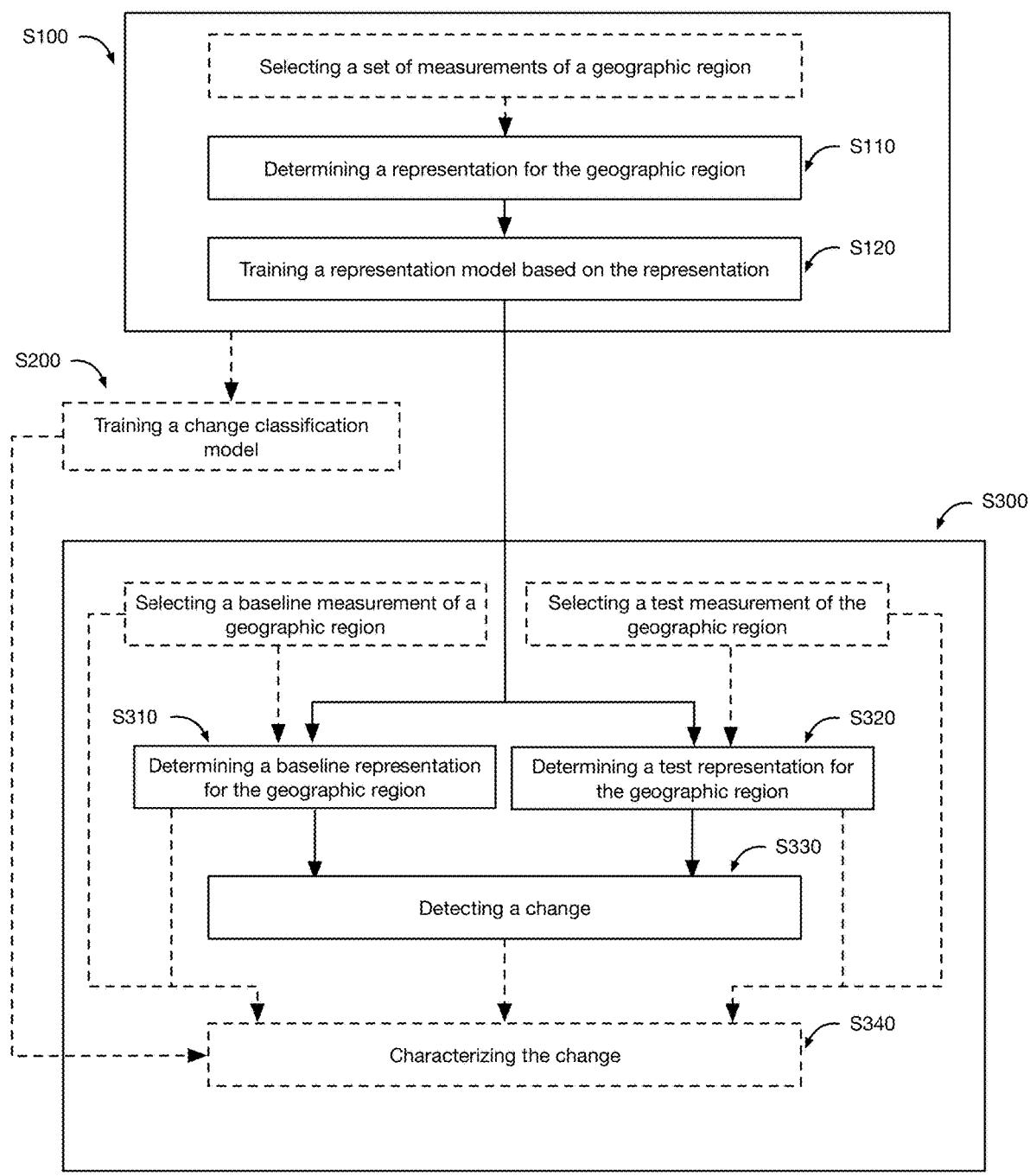
FIG. 2 is a first flowchart representation of a variant of the method.
Figure 6:
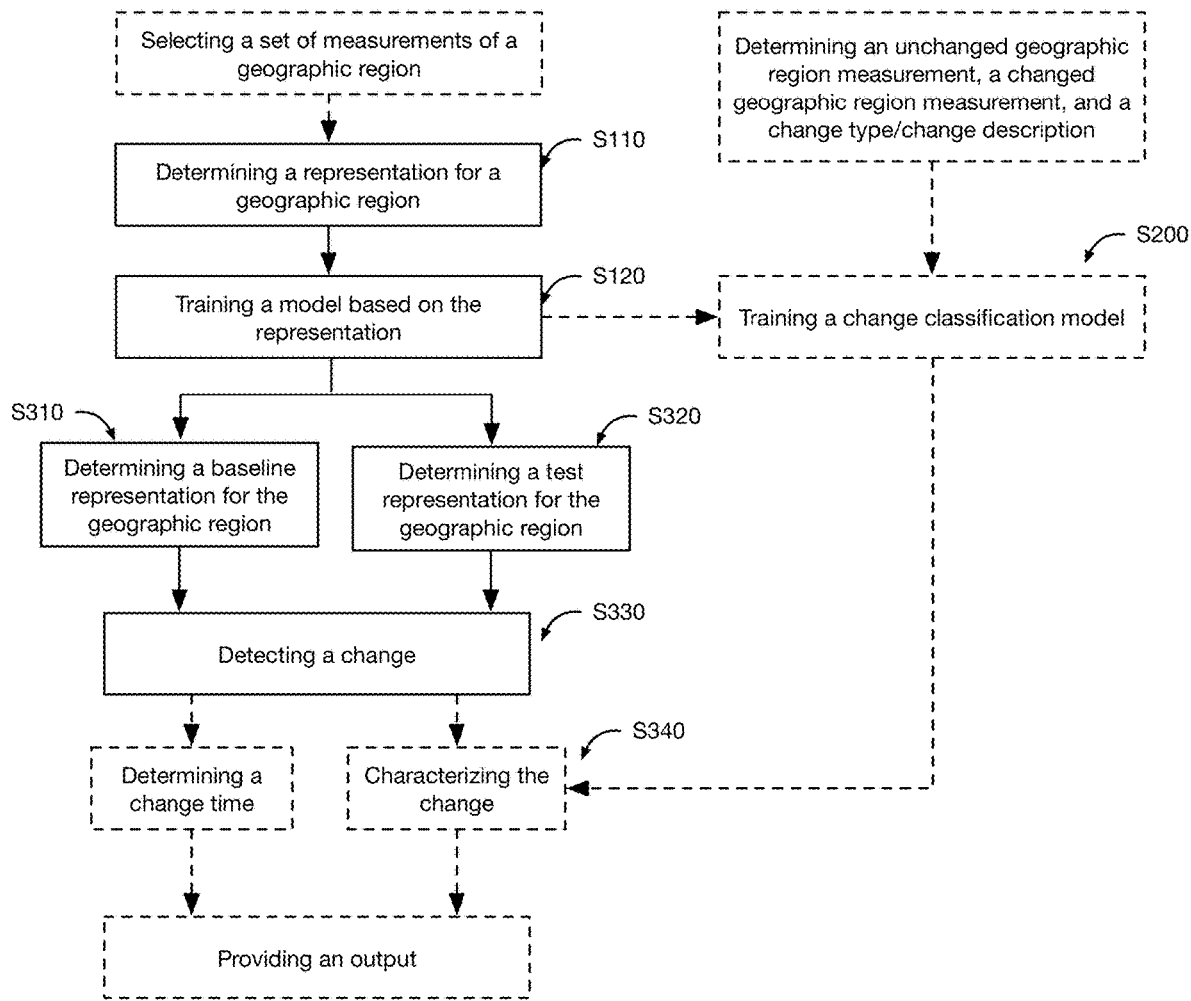
FIG. 6 is a second flowchart representation of a variant of the method.

As shown in FIG. 2 and FIG. 6, S100 can include: determining a representation for a geographic region S110 and training the representation model based on the representation S120.

Determining a representation for a geographic region S110 functions to determine a representation for a geographic region using a representation model based on one or more measurements. S110 can be iteratively performed for each of a set of geographic regions (e.g., training geographic regions), for each of a set of geographic region measurements (e.g., corresponding to a training geographic region), for each of a set of geographic region measurement pairs (e.g., corresponding to a training geographic region), and/or any number of times.

S110 can include: determining a set of measurements for a geographic region, and determining one or more representations of the geographic region from the set of measurements. However, S110 can be otherwise performed.

The measurements used to determine one or more representations for the geographic region can be a single measurement of the geographic region; a pair of measurements (e.g., within a set or batch of measurement pairs); one or more batches of measurements (e.g., a first batch and a second batch, wherein the first and second batches can include the same or different measurements of the same geographic region); and/or be otherwise defined. The measurements are preferably heterogeneous measurements (e.g., differing in one or more features, differing measurement contexts, etc.), but can alternatively not be heterogeneous measurements (e.g., be homogeneous).

The measurements (e.g., a first and second measurement) preferably differ in common changes, but can additionally or alternatively not differ in common changes. The measurements can be specific to a change type (e.g., a common change type; such as the first measurement includes a car, but the second measurement does not include a car, etc.) and/or not be specific to a change type (e.g., the first measurement includes a car, second measurement includes clouds, etc.). The measurements are preferably an unlabeled set (e.g., pair) of measurements, wherein one or more change information elements is unknown for the set of measurements. For example, unlabeled change information can include: rare change occurrence (e.g., whether the pair of measurements depicts a rare change), common change occurrence (e.g., whether the pair of measurements depicts a common change), change type (e.g., rare change type, common change type, etc.), change extent, change magnitude, change time, change cost, change description, and/or any other change information.

The measurements are preferably associated with different measurement times (e.g., sampled at different times), but can additionally or alternatively be associated with the same time. For example, a first measurement is associated with a first time and a second measurement is associated with a second time. In examples, the difference between the first and second time can be 6 hours, 12 hours, 1 day, 1 week, 2 weeks, 1 month, 2 months, 4 months, 6 months, 1 year, 2 years, 5 years, 10 years, and/or any other time difference. The difference between the first and second time can optionally be greater than a threshold time difference, wherein the threshold time difference can be between 1 day—5 years or any range or value therebetween (e.g., 1 day, 1 week, 2 weeks, 1 month, 6 months, 1 year, 2 years, 5 years, etc.), but can alternatively be less than 1 day or greater than 1 year.

The measurements preferably represent (e.g., depict) the same geographic region, but can additionally or alternatively represent different geographic regions. For example, a first measurement depicts a first property within the geographic region (e.g., neighborhood) and a second measurement depicts a second property within the geographic region.

A measurement can optionally be determined based on another measurement. For example, a second measurement can be determined based on a first measurement (e.g., to simulate a common and/or rare change, to simulate additional measurement variability, to increase robustness of the representation model, to adjust a distribution of the training data, to debias the training data, etc.). In examples, the second measurement can be a modified first measurement (e.g., modified using a model). Examples of modifications include: color adjustments, measurement pose (e.g., position and/or angle) adjustments, resolution adjustments, addition of obstructions (e.g., trees), removal of obstructions, and/or any other modifications.

The measurements can be randomly selected (e.g., from a set of measurements for a geographic region), selected based on a distribution of common changes, selected based on measurement time, sequentially selected (e.g., iterate through each of a set of measurements to perform S110 for each pair), include all available measurements for a geographic region, exclude measurements associated with known rare changes (e.g., disasters, remodeling, etc.), and/or otherwise selected.

The measurements can: include only measurements depicting common changes, exclude measurements depicting rare changes, include both measurements including both common changes and rare changes (e.g., as positive and negative test sets, respectively), include a set of measurements with unknown common/rare change type (e.g., unlabeled data, such as for self-supervised feature learning), and/or include any other suitable measurements.

Determining one or more representations of the geographic region from the set of measurements can include: extracting a representation of the geographic region from a single measurement, from multiple measurements, and/or from any other suitable set of measurements. The representation preferably includes a set of features (e.g., nonsemantic features, semantic features, etc.), but can additionally or alternatively include a set of labels and/or any other suitable representation. The representation is preferably determined by the representation model (e.g., trained or untrained), but can alternatively be determined by the change classification model and/or by any other suitable model.

Figure 3A:
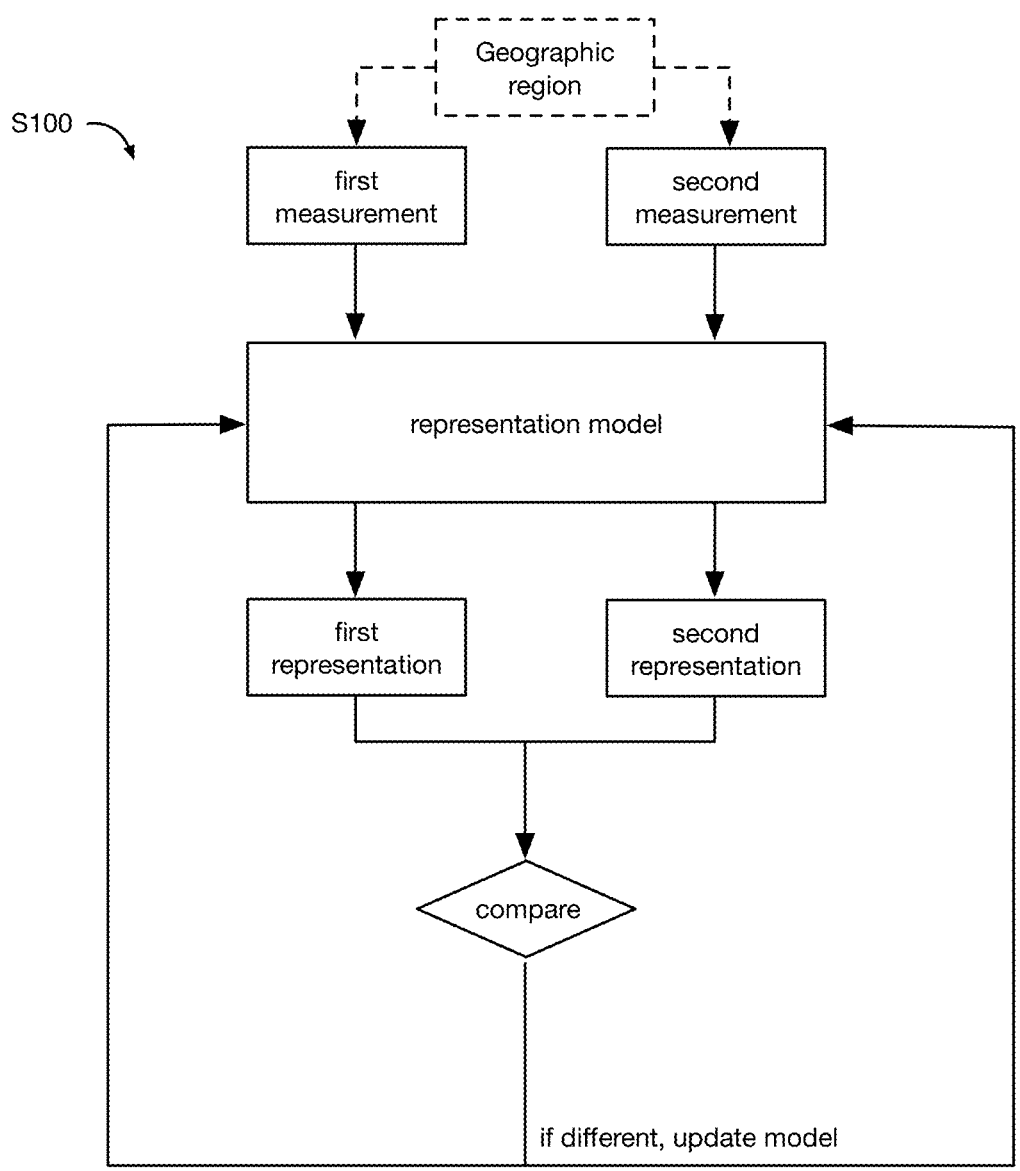
FIG. 3A is a first illustrative example of training a representation model.
Figure 3B:
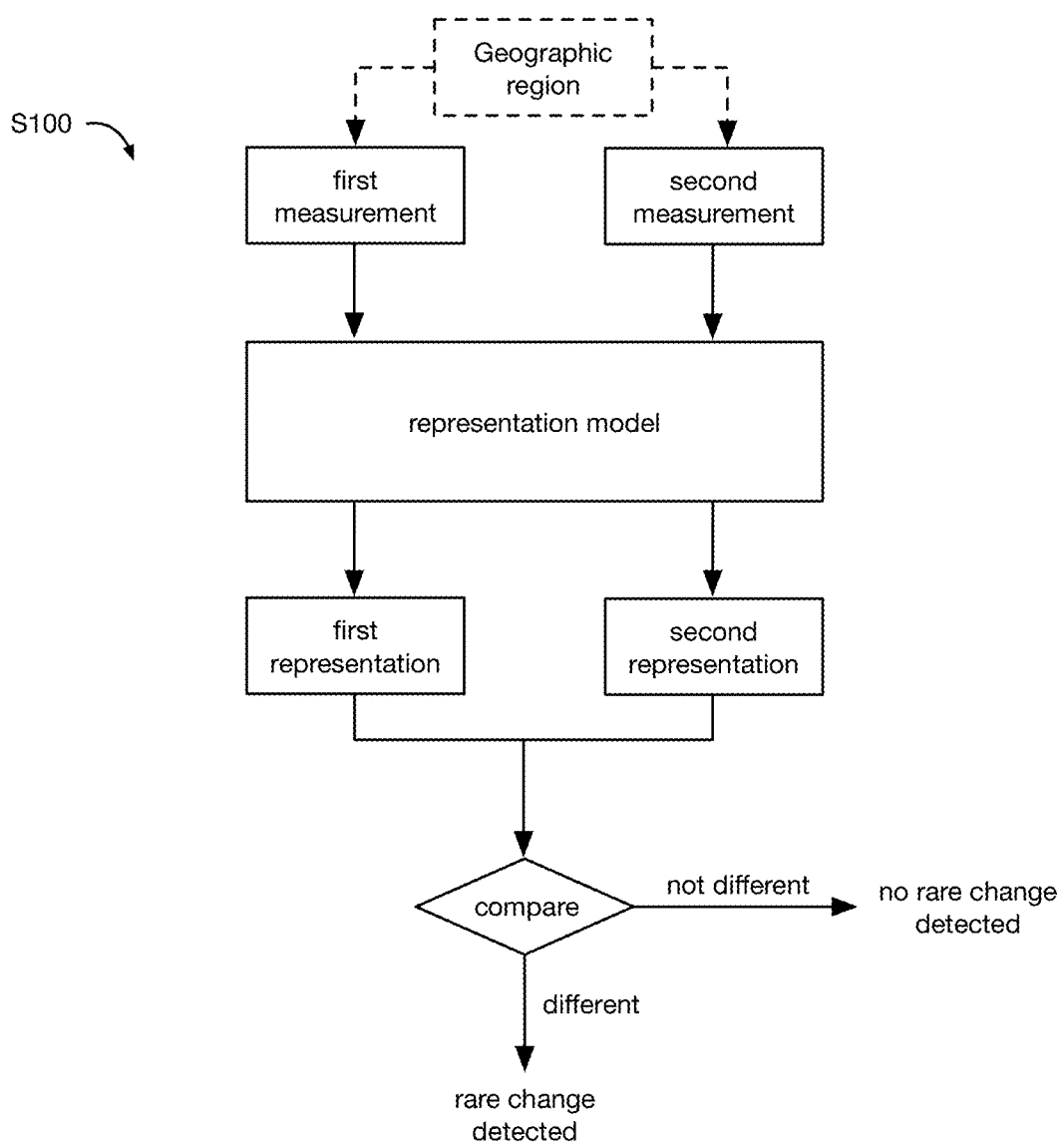
FIG. 3B is a first illustrative example of change detection using the representation model.

In a first variant, S110 includes determining a geographic region representation based on a single measurement. For example, S110 can include determining a first and second representation for a geographic region, based on a first and second measurement, respectively. The first representation and the second representation are preferably extracted by the same representation model, but can additionally or alternatively be extracted by different representation models. Examples of different representation models can include: an online model and target model pair (example shown in FIG. 5A and FIG. 5B), related models (e.g., wherein the models share all or some of the weights; wherein the weights for one model are derived from the weights of the other), models with different base networks, and/or other representation models. In an example using the same representation model, the model input for a representation model (e.g., neural network) is a first measurement (e.g., first image), and the model output for the representation model (e.g., neural network) is a first representation (e.g., first vector). The model input for the same representation model (e.g., neural network) is a second measurement (e.g., second image), and the model output for the same representation model (e.g., neural network) is a second representation (e.g., second vector); examples shown in FIG. 3A and FIG. 3B.

Figure 20:
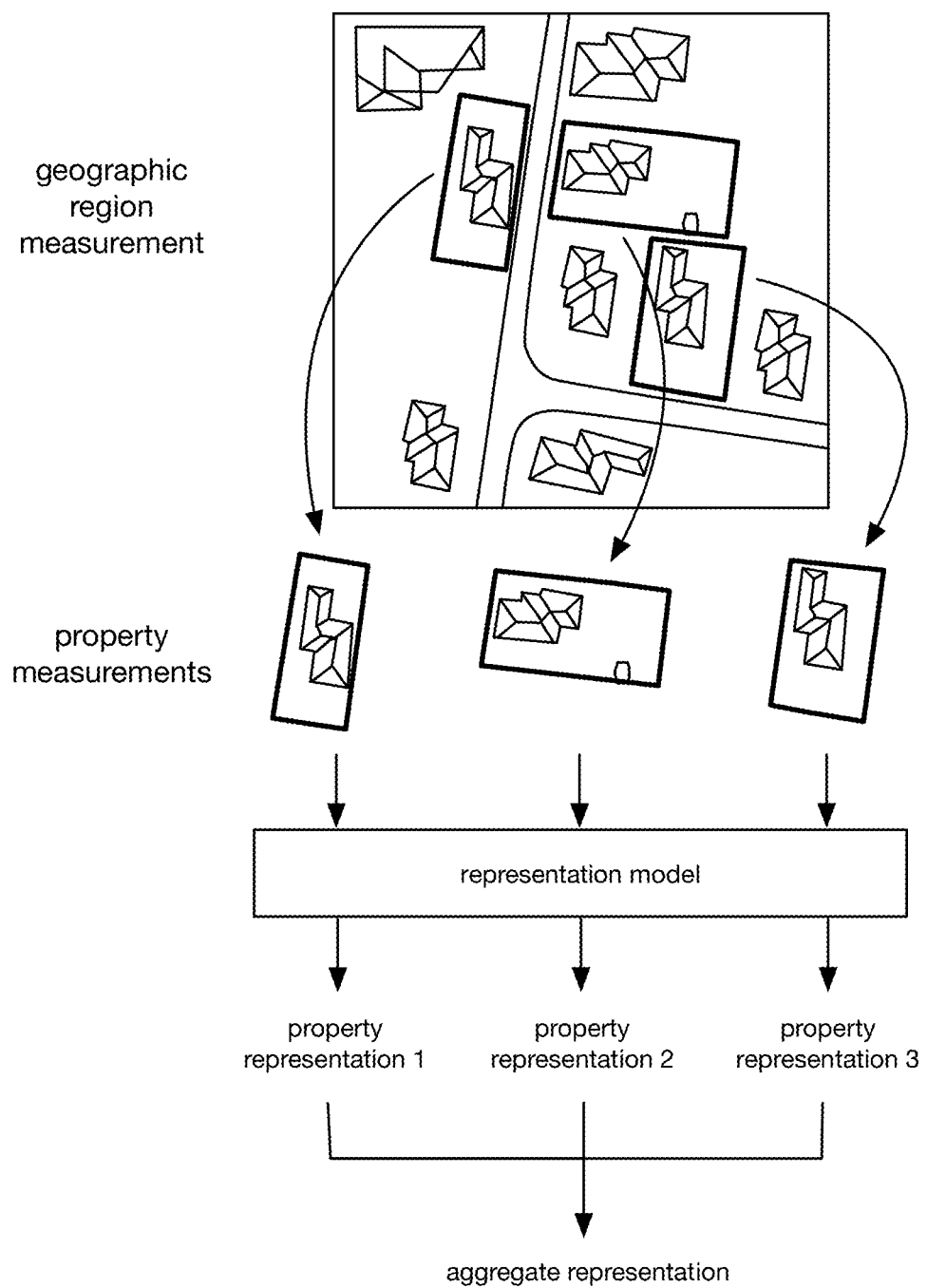
FIG. 20 is an illustrative example of determining a aggregate geographic region representation.

In a second variant, S110 includes determining a geographic region representation based on multiple measurements (e.g., the representation model receives two or more measurements and outputs a single representation). In a specific example, the representation can be a measurement-pair representation, wherein the representation is for a pair of measurements. In a first embodiment, the geographic region representation (e.g., the measurement-pair representation) can be a comparison metric (e.g., determined via S120 methods) between a first intermediate representation and a second intermediate representation (e.g., wherein the intermediate representations are determined using the first variant). In a second embodiment, the geographic region representation (e.g., the measurement-pair representation) can be a concatenated first intermediate representation and second intermediate representation. In a third embodiment, the geographic region representation can be an aggregated representation for a set of intermediate representations (e.g., wherein each of the intermediate representations is determined based on a single measurement). For example, an intermediate representation can be determined for each property in a geographic region (e.g., determined based on a corresponding measurement for the property), wherein the aggregated representation is concatenation, average (e.g., weighted average), and/or any other aggregation of the set of intermediate representations (e.g., example shown in FIG. 20). In a fourth embodiment, the geographic region representation (e.g., the measurement-pair representation) can be directly determined based on multiple measurements (e.g., without intermediate representations). In a fourth embodiment, the representation can be a representation of the concatenated representations. The multiple measurements can be two measurements (e.g., a first and second measurement, as described in the first variant) and/or any number of measurements.

However, the representation for a geographic region can be otherwise determined.

Training the representation model based on the representation S120 functions to train a representation model using the representation as input. The representation model can be used to determine a baseline representation for a geographic region, be used to determine whether a change has occurred, and/or be otherwise used. The model is preferably the same representation model from S110, but can additionally or alternatively be a different model. S120 can be performed after S110 (e.g., after each instance of S110, after S110 is iteratively performed for each of a set of training geographic regions, etc.), and/or at any other time. S120 can be performed once (e.g., for each geographic region, for each pair of first and second measurements, etc.), iteratively until a stop condition is met, and/or at any other time. In examples, the stop condition can include: a comparison metric indicates that a first and second representation (determined via S110) for a set of geographic regions are substantially similar (e.g., on average), when a predetermined number of representation pairs or batches (corresponding to measurement pairs or batches) have been processed, when a predetermined number of training iterations have been performed, and/or any other stop condition.

The representation model can be trained using self-supervised learning (e.g., noncontrastive self-supervised learning; contrastive self-supervised learning; etc.), but additionally or alternatively be trained using semi-supervised learning, supervised learning, unsupervised learning, transfer learning, reinforcement learning, single-shot learning, zero-shot learning, and/or any other suitable training method. In an example, the representation model can be trained using noncontrastive self-supervised learning, wherein the measurements are assumed to be positive examples (e.g., depict common changes only). In a first specific example, the training measurements only include measurements depicting common changes. In a second specific example, the training measurements can include measurements depicting rare and common changes (e.g., wherein the rare changes are rare enough that they do not substantively affect the overall model training). Examples of self-supervised learning that can be used can include: bootstrap your own latent (BYOL), bidirectional encoder representations from transformers (BERT), momentum contrast (MoCo), contrastive learning of visual representations (SimCLR), instance discrimination, contrastive predictive coding (CPC), Deep InfoMax, and/or any other suitable self-supervised learning method.

Figure 4A:
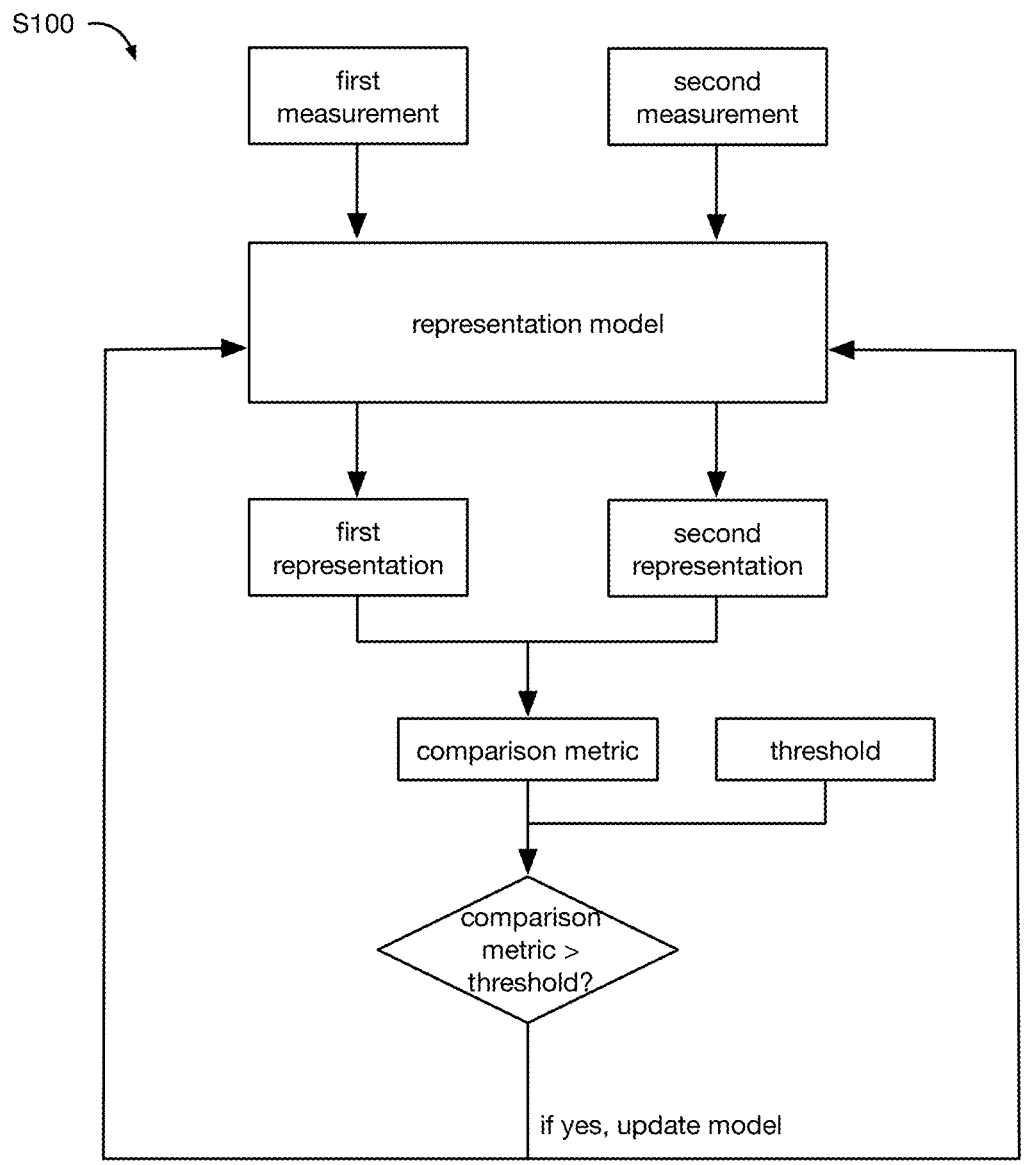
FIG. 4A is a second illustrative example of training a representation model.
Figure 4B:
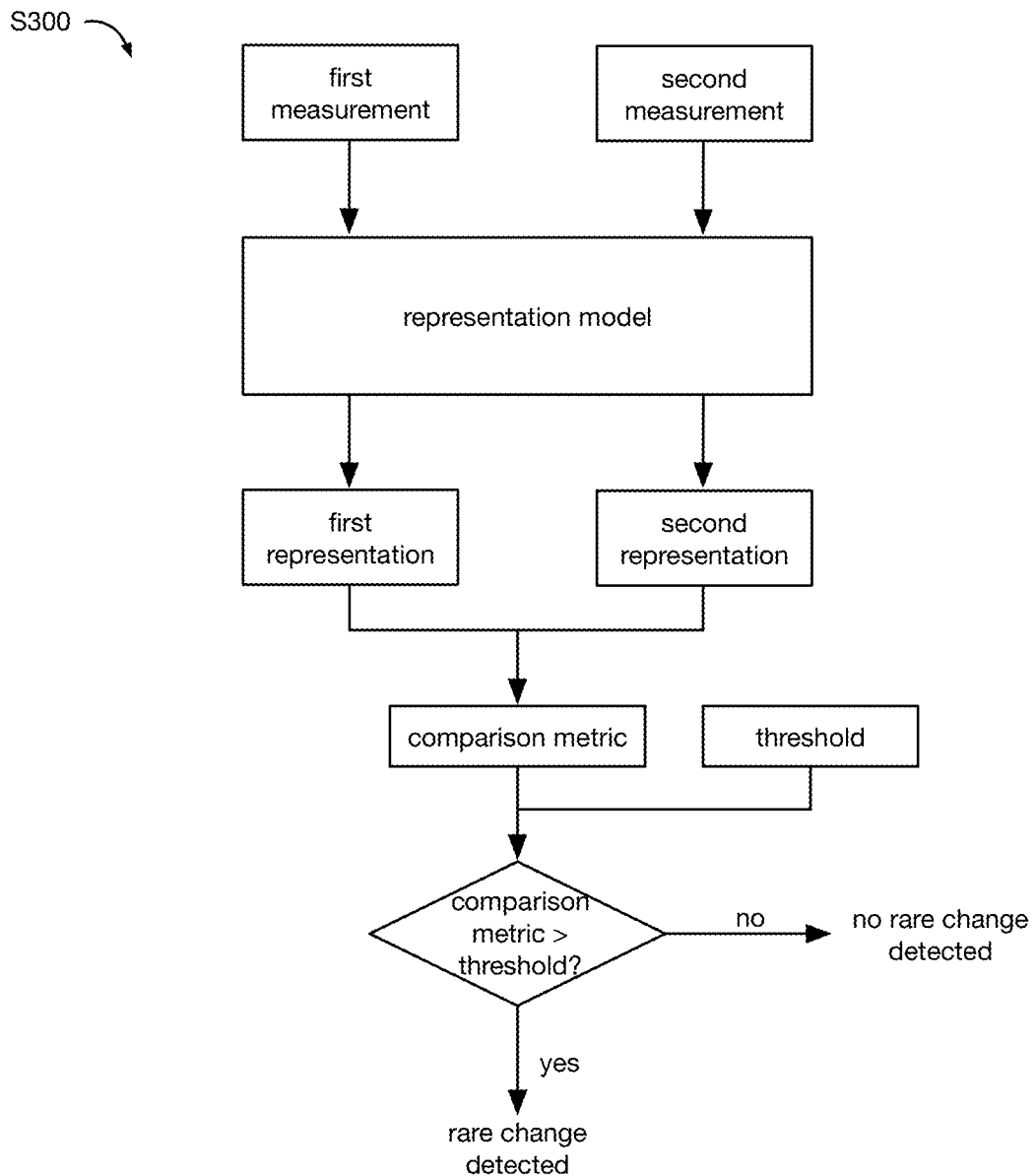
FIG. 4B is a second illustrative example of change detection using the representation model.
Figure 4C:
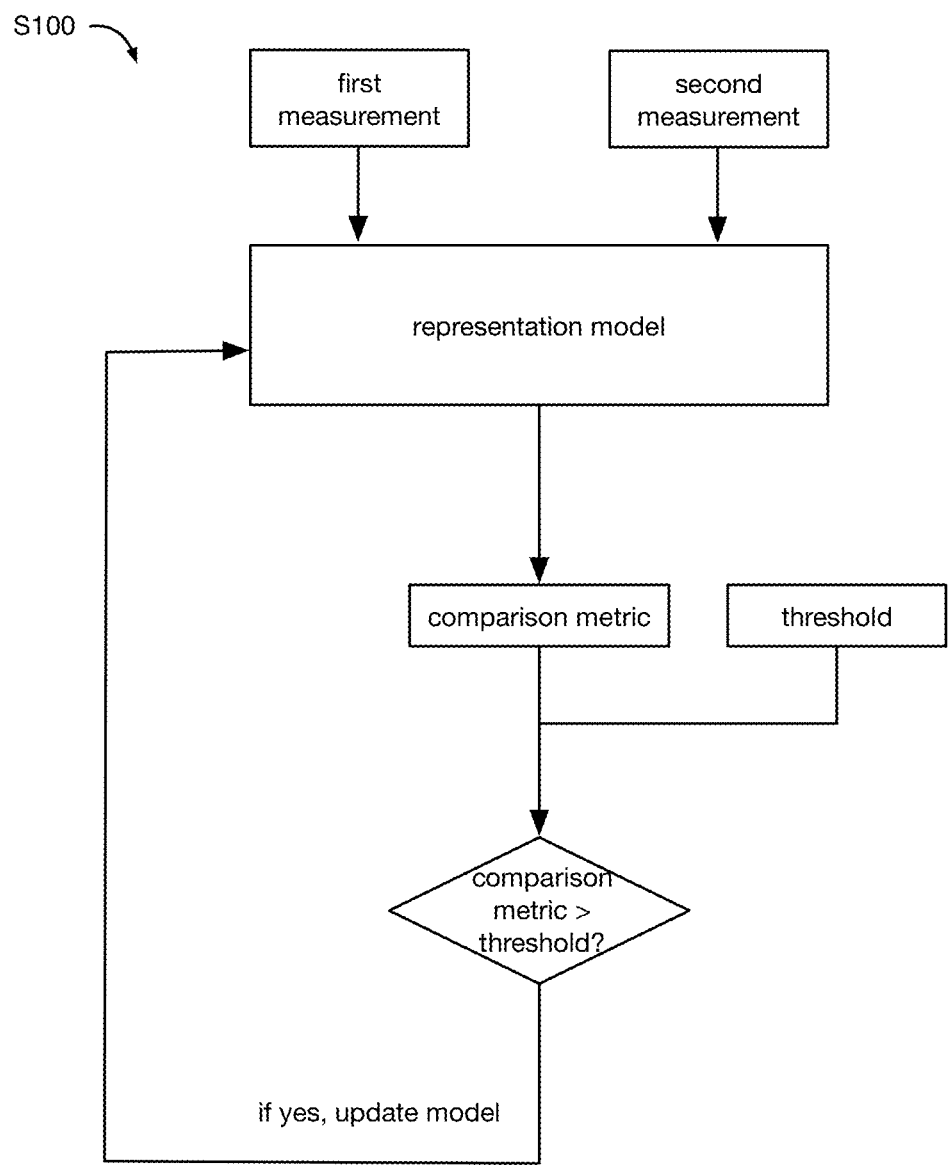
FIG. 4C is a third illustrative example of training a representation model.

In a first variant, training the representation model includes determining a comparison metric (e.g., based on a first and second representation of the same geographic region), and training the representation model using the comparison metric; examples shown in FIG. 4A and FIG. 4C. The comparison metric can be discrete, continuous (e.g., distance, probability of a rare change occurrence, etc.), binary (e.g., rare change occurrence, no rare change occurrence), multiclass, and/or otherwise structured. The comparison metric can include: a loss function metric, a distance metric, a similarity metric (e.g., Jaccard similarity, cosine similarity, etc.), a dissimilarity metric, a clustering metric, a threshold comparison, a statistical measure, and/or any other suitable metric. Distance metrics can include a vector distance (e.g., a distance between a first representation vector and a second representation vector), wherein the distance is determined using: cosine distance, Euclidean distance, Chebyshev distance, Mahalanobis distance, and/or any other method.

In a first embodiment of the first variant, the comparison metric is based on a comparison between a first and second geographic region representation (e.g., determined via Silo methods). For example, the comparison metric can represent a similarity between the first representation and the second representation. In a specific example, the comparison metric can be a vector distance between a first vector representation and a second vector representation. In a second embodiment of the first variant, the comparison metric is based on a comparison between a representation and an aggregated representation. In an illustrative example, the comparison metric is based on a vector distance between a representation for a property of interest and an aggregate representation for other properties within a geographic region. In a third embodiment of the first variant, the comparison metric is based on a single geographic region representation (e.g., a concatenated representation, an aggregate representation, etc.).

In variants, the representation model can be updated (e.g., the representation model weights are updated) when the comparison metric does not satisfy a training target. In a first variant, the training target includes the comparison metric equal to 0 (e.g., substantially equal to 0). For example, training the representation model can include minimizing the absolute value of the comparison metric. In a specific example, training the representation model can include training the representation model to predict the same first and second representations for the geographic region (e.g., based on different measurements of the geographic region). In a second variant, the training target includes the comparison metric (and/or an absolute value of the comparison metric) is less than a threshold (e.g., a training threshold). However, any other training target can be used to train the representation model.

Figure 5A:
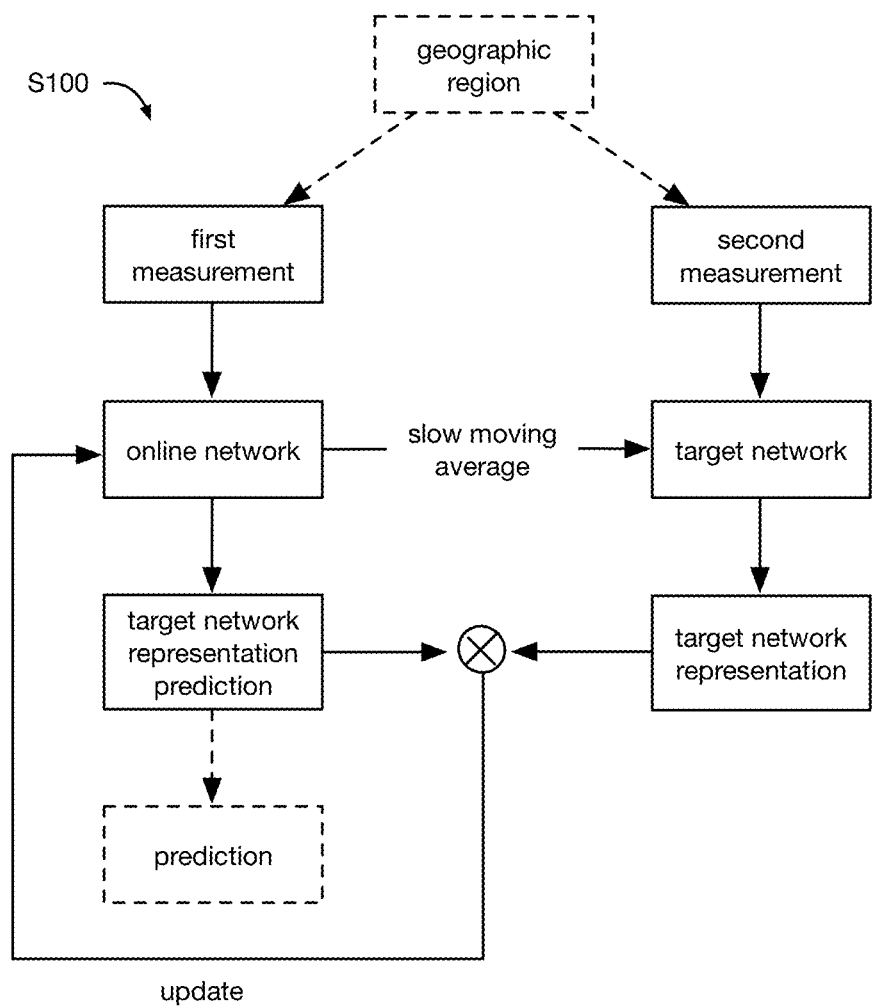
FIG. 5A is a fourth illustrative example of training a representation model.
Figure 5B:
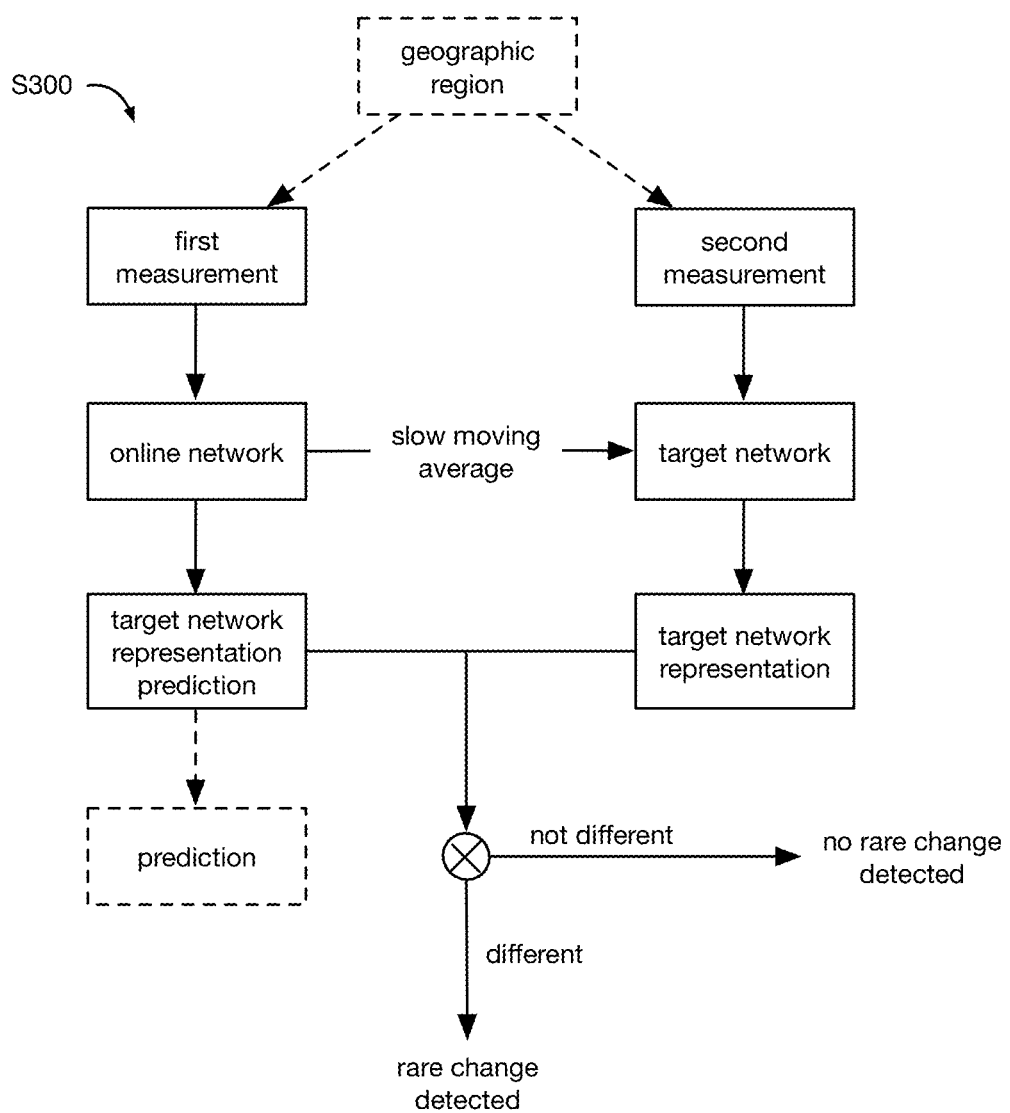
FIG. 5B is a fourth illustrative example of change detection using the representation model.

In a second variant, the representation model can be trained using BYOL; example shown in FIG. 5A. The first measurement and the second measurement are ingested by an online network and a target network, respectively. The online network is trained to predict the target network representation of the second measurement, and the target network is updated with a slow-moving average of the online network. The online network is preferably used for inference in S330, but the target network can alternatively be used.

However, the representation model can be otherwise trained.

Training a change classification model S200 functions to train the change classification model to classify the type of change (e.g., the type of rare change) depicted across pre-change and post-change measurements. S200 can be performed after S100, during S100, and/or at any other suitable time.

The change classification model can be trained using supervised learning, but additionally or alternatively be trained using semi-supervised learning, self-supervised learning, unsupervised learning, transfer learning, reinforcement learning, single-shot learning, zero-shot learning, and/or any other suitable method.

Training a change classification model to determine a change type (e.g., rare change type) preferably uses ground-truth data (e.g., with labels of change type), but can alternatively not use ground-truth data. The change classification model can be trained using a set of individual measurements labeled with a change type (and/or change description), a set of measurement pairs (e.g., pre- and post-change) labeled with an intervening change type (and/or change description), a set of individual labeled representations (e.g., individual representations, individual measurement-pair representations, etc.), a set of labeled representation pairs, and/or any other suitable set of training data. In example, change type labels and/or change description labels can be determined: manually, automatically (e.g., by comparing text descriptions of the first and second measurements), using predetermined assignments, and/or otherwise determined. The change classification model can be trained to predict the ground-truth labels, and/or predict any other suitable output.

Examples of rare change types can include: addition, removal, or modification of an object (e.g., tree, structure, building, pool, deck, road, roof, structure, water level, etc.); remodeling or repair work (e.g., construction work, reparation work, ground remodeling, repainting, reroofing, etc.); damage; demolition; and/or any other suitable change type. Specific examples of rare change types can include changes in: physical geometry of permanent structures (e.g., more than a threshold amount of geometric change in an object associated with a permanent label); property condition (e.g., displacement of shingles on a roof, addition and/or removal of debris, garden remodeling, etc.), condition of surrounding trees (e.g., broken tree limbs, torn bark, shredded foliage, etc.), water level of body of water (e.g., increasing water level of lake), and/or any other suitable change.

Figure 7:
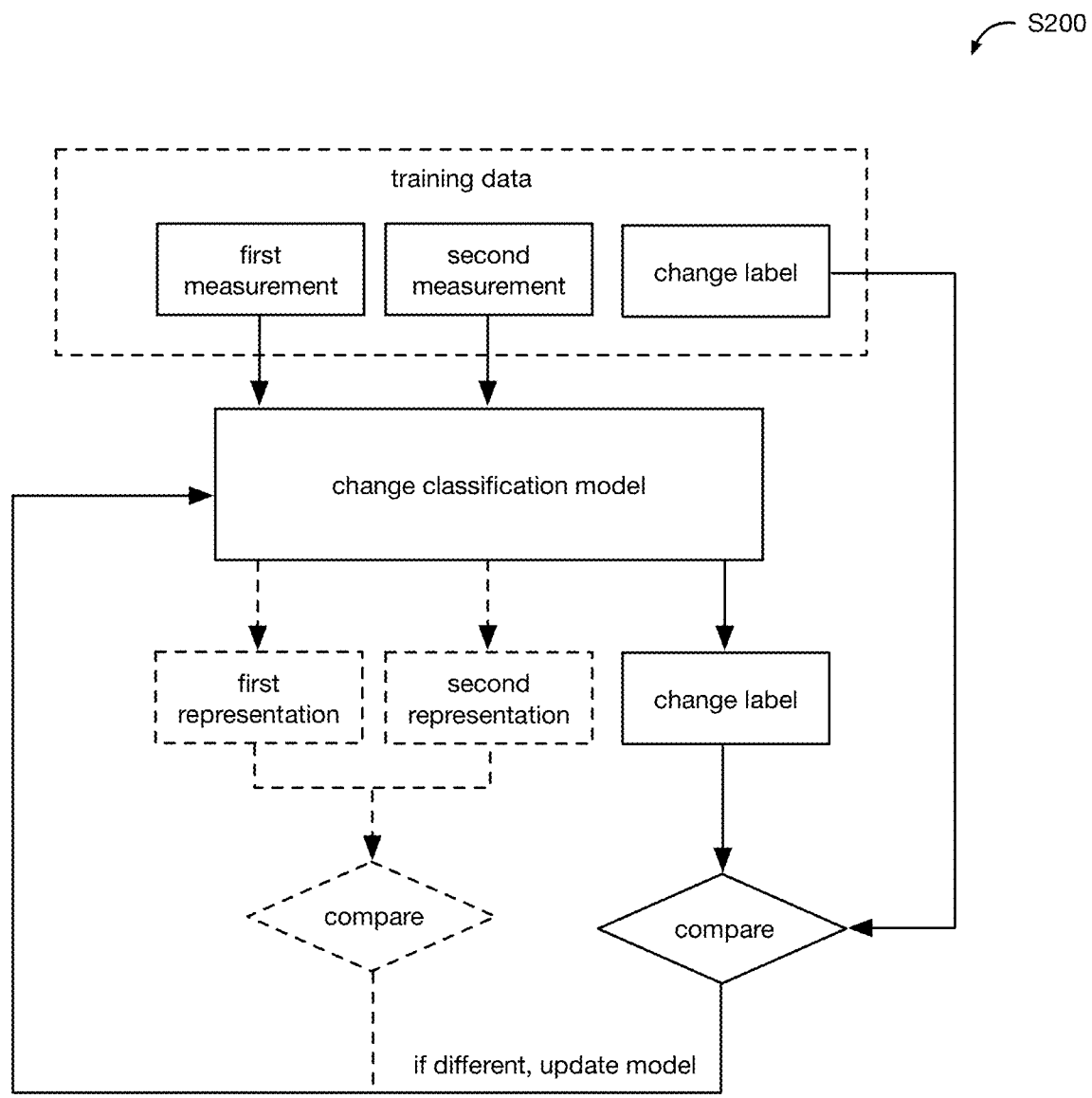
FIG. 7 is a first illustrative example of training a change classification model.

In a first variant, the change classification model is the representation model (e.g., trained via S100), wherein the representation model can be trained to output a rare change label (e.g., change type and/or change description) by labeling the training data (e.g., the same training data used in S100) with the rare change type; example shown in FIG. 7.

For example, the representation model can be trained to predict the representation and the rare change type.

Figure 9:
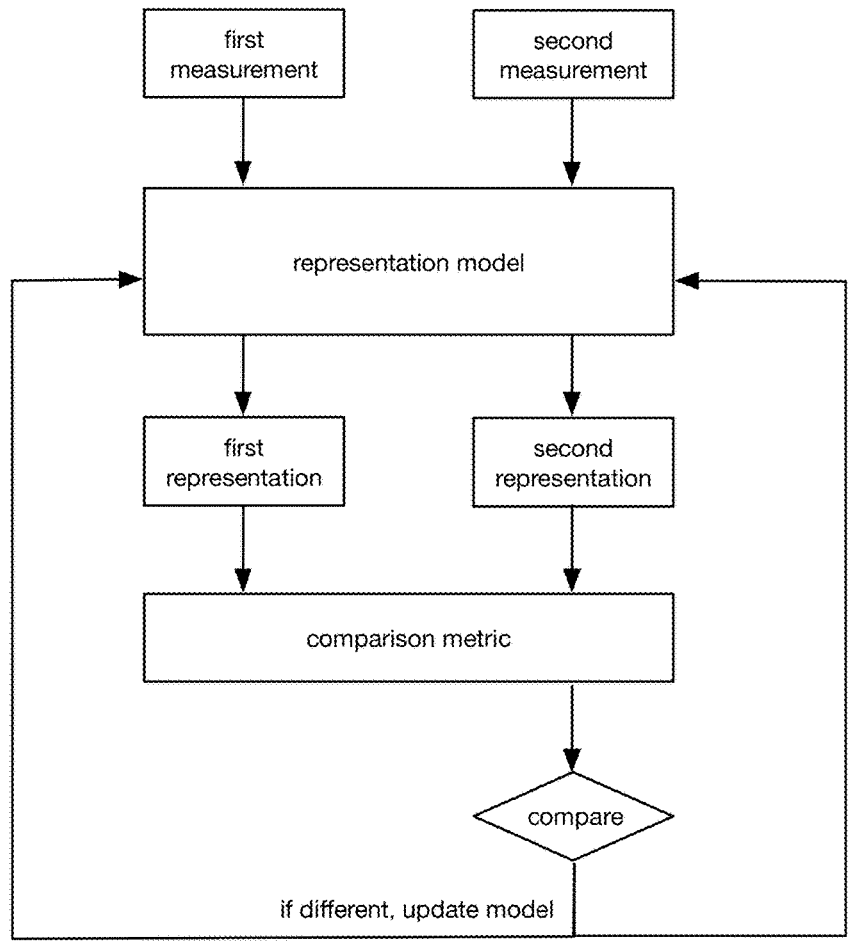
FIG. 9 is a third illustrative example of training a change classification model.
Figure 9:
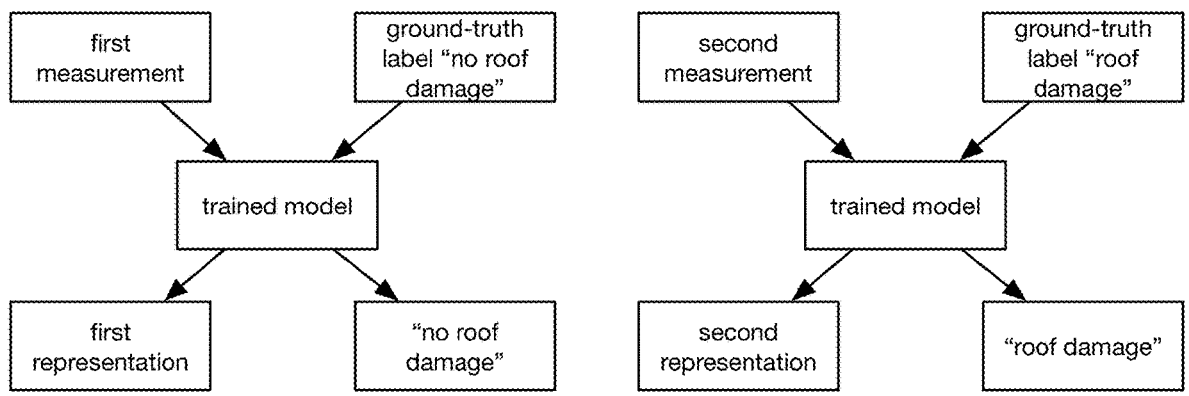

In a second variant, the change classification model is the representation model (e.g., trained via S100), wherein the representation model can be tuned to be specific to a rare change type (e.g., after the representation model is trained to output the same representation given different measurements of the same geographic region); example shown in FIG. 9. The representation model can be tuned to predict the representation and the rare change type, tuned to be agnostic to other rare change types (e.g., wherein other rare changes are included in the training set for initial representation model training in S100), and/or otherwise tuned. The representation model can be tuned using pre-change and post-change measurement pairs (e.g., image pairs) for the same geographic region for a given rare change type, and/or using any other suitable training data.

Figure 8:
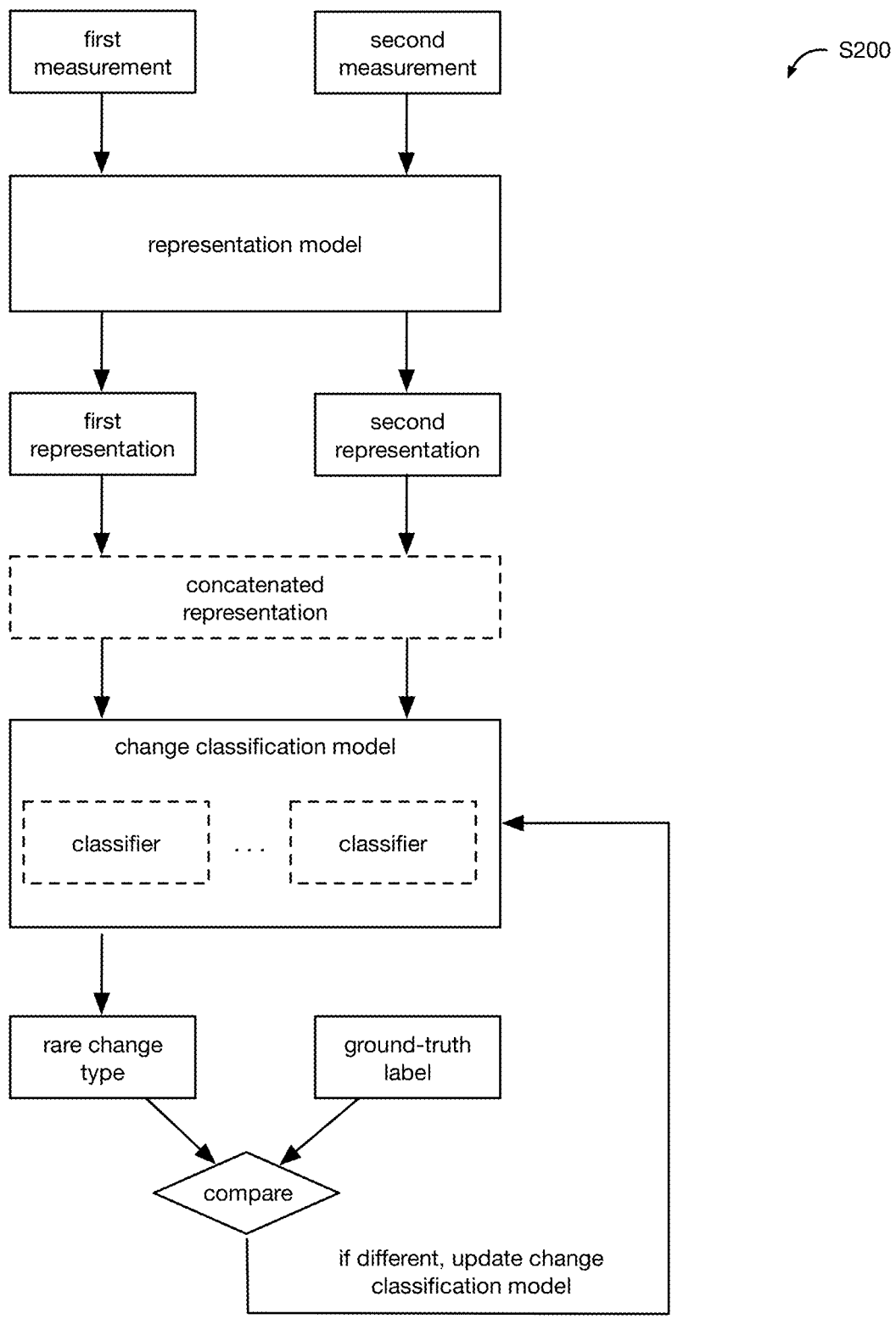
FIG. 8 is a second illustrative example of training a change classification model.

In a third variant, the change classification model is different from the representation model, wherein the change classification model is trained to predict the change type; example shown in FIG. 8. In a first example, a first representation can be extracted from a pre-rare change measurement and a second representation can be extracted from a post-rare change measurement (e.g., using the representation model, wherein the change classification model is downstream of the representation model). The first and second vectors can be ingested by the change classification model, and the change classification model can be trained to predict the rare change type. In a second example, a pre-rare change measurement and a post-rare change measurement can be ingested by the change classification model, and the change classification model can be trained to predict the rare change type.

In a first embodiment, the change classification model includes a classifier (e.g., linear classifier) and/or a jointly trained image feature extractor that predicts the change type label. In this example, the rare change type labels can be multiclass, including one of a predetermined set of rare change types (e.g., x added, x removed, x remodeled, etc.).

In a second embodiment, the change classification model includes and/or interfaces with a text encoder and/or an image encoder (e.g., the change classification model is a CLIP model). The text encoder input can include a set of change descriptions and/or any other suitable inputs. The text encoder output can include a set of text representations (e.g., vector, embedding, array, set, matrix, encoding, multidimensional surface, single value, etc.), each text representation corresponding to a change description in the set of change descriptions. The image encoder can be a representation model (e.g., the same representation model trained in S100, a different representation model, etc.) and/or any other image encoder. The image encoder input can include measurements (e.g., a pair of measurements) and/or any other suitable inputs. The image encoder output can include a measurement-pair representation and/or any other suitable output.

At test time, the change classification model can determine the change type (e.g., a change description corresponding to a change type) based on text representation(s) (e.g., output from the text encoder) and measurement-pair representation(s) (e.g., output from the image encoder). For example, the change classification model can determine a likelihood that measurements (e.g., a first measurement and a second measurement) depict a given change type based on geographic region representations (e.g., a first representation and a second representation, a measurement-pair representation, etc.) and a text representation (e.g., corresponding to a change description for the given change type). In a specific example, the trained text encoder synthesizes a zero-shot classifier (e.g., linear classifier) by embedding target change descriptions, and predicts the text describing the rare change occurring between two measurement inputs. In an example, the change classification model determines a comparison metric based on the text representation and the measurement-pair representation, wherein the comparison metric represents a likelihood that the measurements used to determine the measurement-pair representation depict the change description used to determine the text representation. The comparison metric can be the same comparison metric used in S100 or a different comparison metric. In a first specific example, the change classification model outputs the comparison metric. In a second specific example, when the comparison metric is above a threshold (e.g., above a predetermined match probability, above a second-highest match probability, etc.), the change classification model outputs the change description (e.g., indicating the measurements depict a change corresponding to the change description). In a third specific example, the change classification model selects one or more change descriptions from a set of change descriptions (e.g., each with a corresponding text representation and comparison metric) associated with the lowest comparison metrics (e.g., the most likely applicable change description). However, the change classification model can otherwise be configured.

Figure 16A:
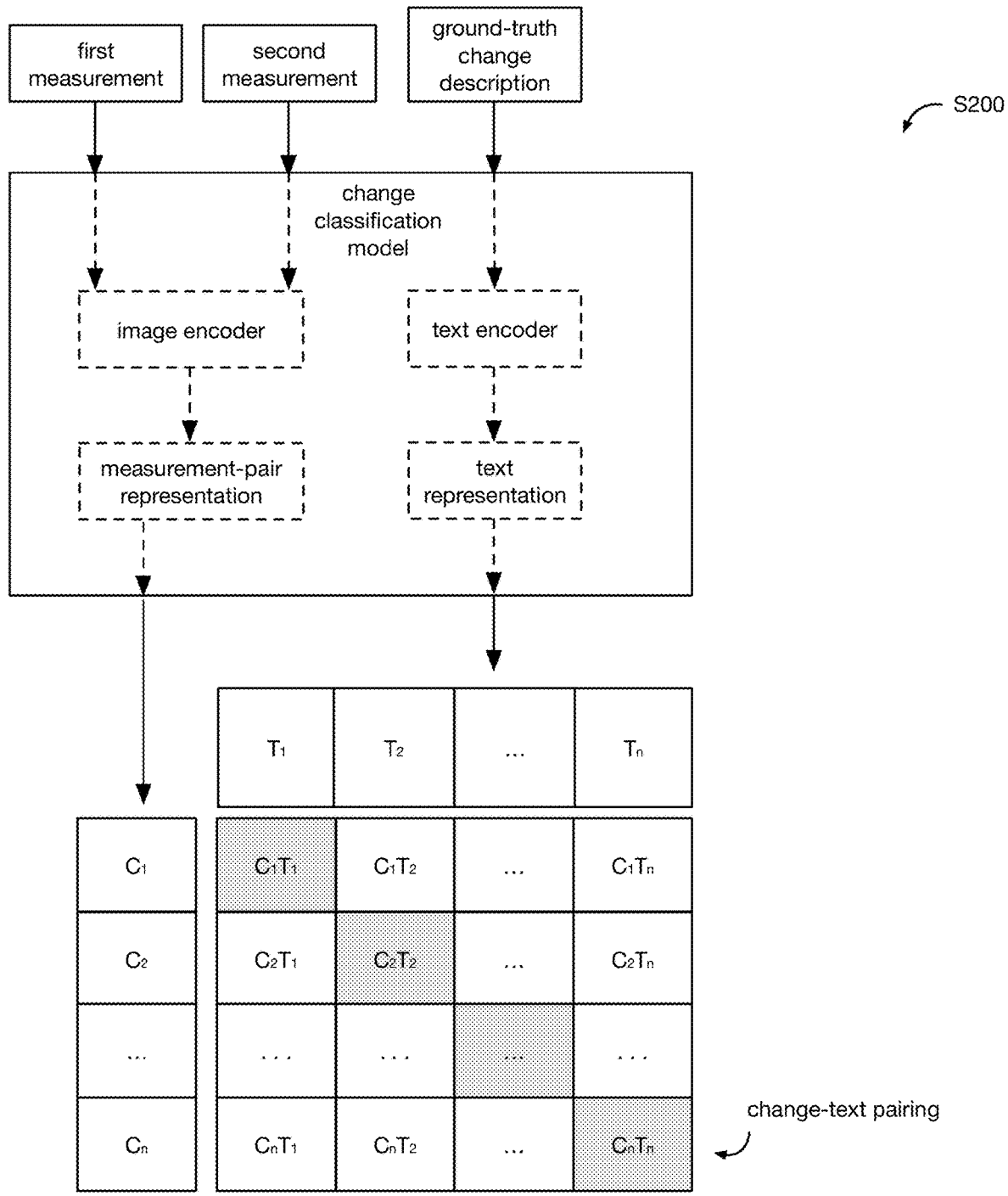
FIG. 16A is a fourth illustrative example of training a change classification model.
Figure 17A:
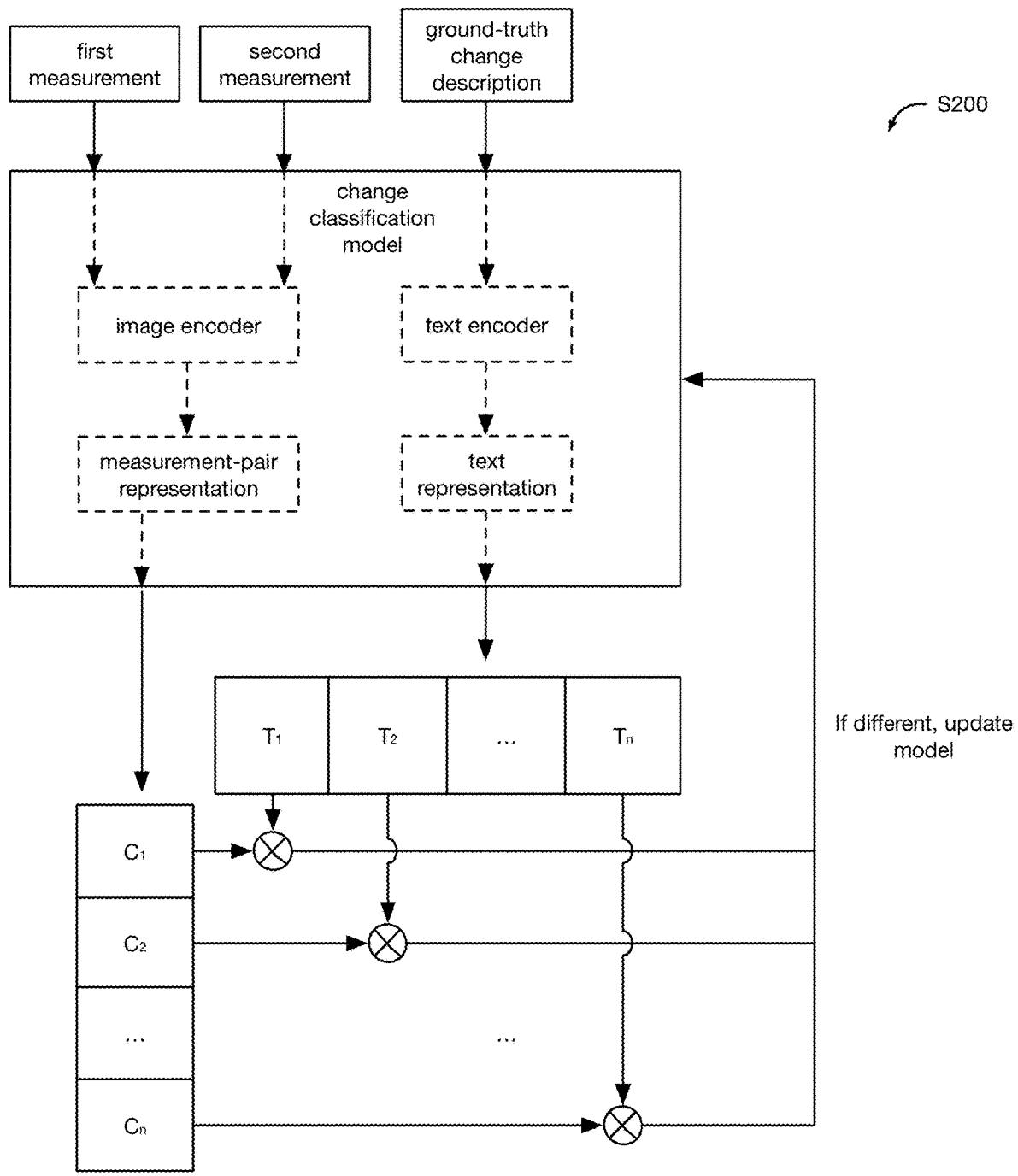
FIG. 17A is a sixth illustrative example of training a change classification model.

In a first example of training the change classification model, the image encoder and text encoder are trained together (e.g., simultaneously, concurrently, using the same training data set, etc.). In this example, the image encoder is preferably not the representation model trained in S100 (e.g., wherein the image encoder is trained using supervised learning and the representation model from S100 is trained using self-supervised learning), but can alternatively be the same representation model. For example, the text encoder and image encoder can be trained using CLIP methods (e.g., modified CLIP methods) with a labeled training dataset (e.g., ground truth data) to predict change-text pairs (e.g., a measurement-pair representation and a text representation corresponding a measurement pair input and a change description, respectively). The labeled training dataset can include pairs of measurement pairs and change descriptions (e.g., two measurements and one or more change descriptions in each training pair) and/or pairs of any number of measurements and change descriptions. Examples are shown in FIG. 16A and FIG. 17A.

Figure 16B:
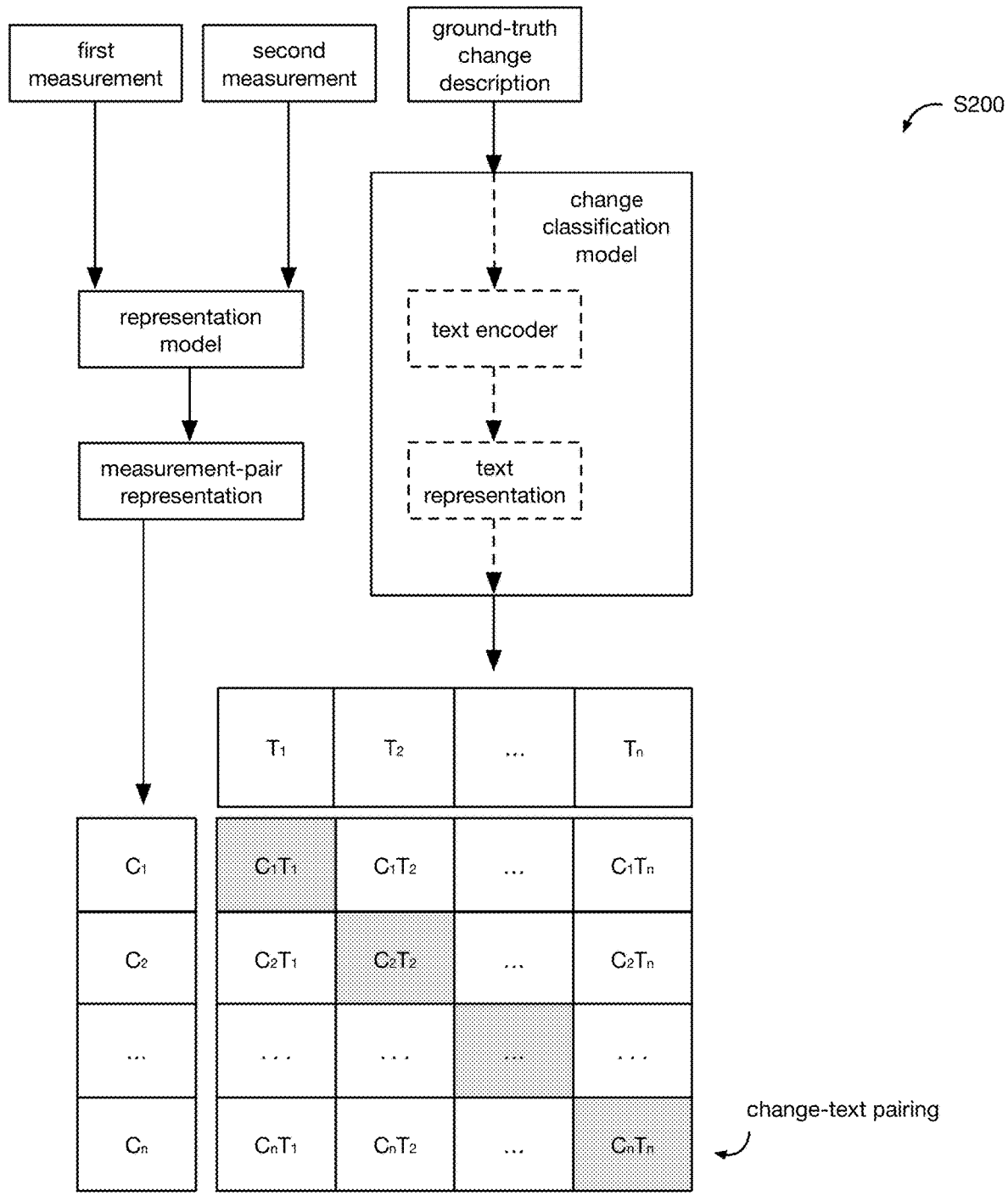
FIG. 16B is a fifth illustrative example of training a change classification model.
Figure 17B:
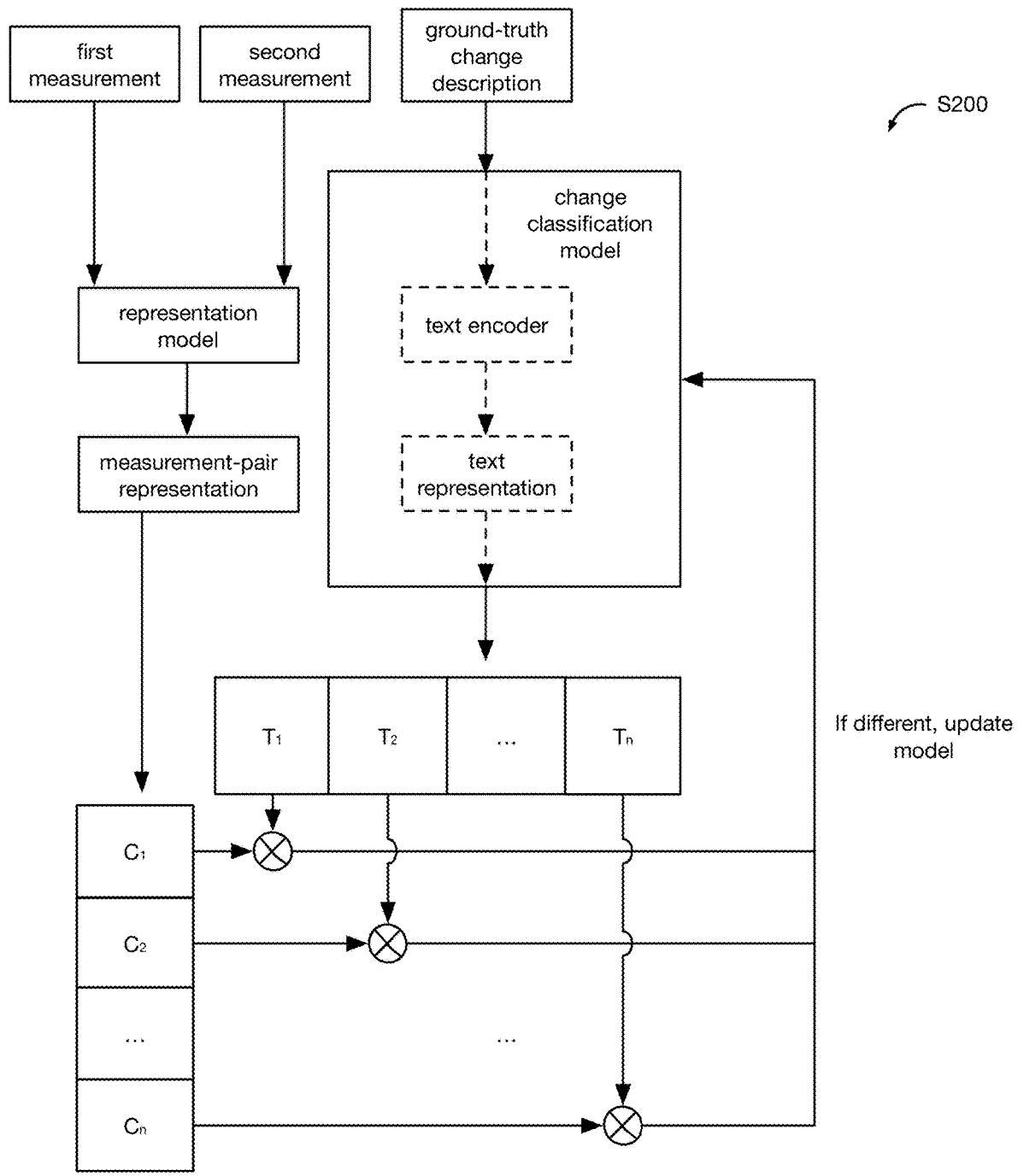
FIG. 17B is a seventh illustrative example of training a change classification model.

In a second example of training the change classification model, the image encoder and text encoder are trained separately (e.g., using different training data sets, etc.). In this example, the image encoder is preferably the representation model trained in S100, but can alternatively not be the same representation model. For example, the image encoder can be trained via S100 methods, and the text encoder can be trained using CLIP methods (e.g., modified CLIP methods) with a labeled training dataset (e.g., ground truth data) to predict change-text pairs. The labeled training dataset can include pairs of measurement-pair representations and change descriptions (e.g., one representation and one or more change description in each training pair), pairs of geographical region representation pairs and change descriptions (e.g., two representations and one or more change description in each training pair), and/or pairs of any number of representations and change descriptions. Examples are shown in FIG. 16B and FIG. 17B.

However, the change classification model can be otherwise trained.

Evaluating a geographic region S300 functions to detect a rare change to a geographic region (e.g., a rare change occurrence) using the trained model. S300 can be performed after S100, after S200, and/or at any other time. In variants, S300 can be performed for each of a set of geographic regions (e.g., for each of a set of properties within a region).

As shown in FIG. 2 and FIG. 6, S300 can include: determining a baseline representation for the geographic region S310, determining a test representation for the geographic region S320, detecting a change S330, optionally characterizing the change S340, optionally determining a change time, optionally providing an output, and/or any other suitable element.

Determining a baseline representation for the geographic region S310 functions to determine a first comparison point for the geographic region (e.g., the property). S310 is preferably performed before S320 and/or contemporaneously with S320 (e.g., the baseline measurement is selected during S320), but alternatively can be performed after S320 and/or any other suitable time.

In a first variant, the baseline representation can be determined based on a baseline measurement for the geographic region using the trained representation model (e.g., extracted from the baseline measurement using the trained representation model). The trained representation model is preferably the representation model trained in S100, but can alternatively be a different model. The baseline measurement is preferably sampled before occurrence of a rare change, but can alternatively be sampled at any other suitable time. The baseline measurement can be selected randomly, according to a set of heuristics (e.g., selecting the earliest measurement associated with the geographic region, selecting the most recent measurement associated with the geographic region prior to a hazard event, etc.), the measurement sampled at a time closest to a baseline time (e.g., a user input baseline time), and/or otherwise selected from a set of measurements for the geographic region of interest.

In a first example, S310 can be pre-performed for each of a set of geographic regions, wherein the baseline representations can be stored in association with a geographic region identifier and subsequently retrieved for test representation evaluation. In variants, the baseline measurement can be discarded after baseline representation extraction, which can reduce the amount of data that needs to be stored for a given geographic region (e.g., property). In a second example, S310 is performed with S320, wherein both the baseline representation and the test representation are contemporaneously selected from the measurements for the geographic region of interest.

In a second variant, the baseline representation can be retrieved from a database, wherein the baseline representation for the geographic region was previously determined as described in the first variant.

However, the baseline representation for the geographic region can be otherwise determined.

Determining a test representation for the geographic region S320 functions to determine a second comparison point for the geographic region. S320 can be performed after a known rare change event (e.g., after a hailstorm, after remodeling the property, etc.), periodically, for each new measurement of the geographic region, in response to a request, and/or any other suitable time. S320 is preferably performed after S310 and/or contemporaneously with S310 (e.g., the baseline measurement is selected during S320), but alternatively can be performed before S310 and/or any other suitable time.

In variants, the test representation can be determined based on a test measurement for the geographic region using a trained representation model. The trained representation model is preferably the same representation model used in S310, but can alternatively be a different model. The test measurement is preferably sampled after a rare change, but can alternatively be sampled at any other suitable time. The test measurement is preferably the most recent measurement for the geographic region, but can alternatively be a past measurement for the geographic region, a randomly selected measurement, a measurement selected according to a set of heuristics (e.g., the most recent measurement after a hazard event), the measurement sampled at a time closest to a test time (e.g., a user input test time), and/or any other suitable measurement.

The baseline measurement and test measurement are preferably heterogeneous measurements (e.g., differing in one or more features, differing measurement contexts, with one or more common changes between the measurements, etc.), but can alternatively not be heterogeneous measurements.

The baseline measurement and test measurement are preferably associated with different measurement times (e.g., sampled at different times), but can additionally or alternatively be associated with the same time. The test measurement is preferably sampled after the baseline measurement, but can alternatively be sampled before the baseline measurement, concurrently with the baseline measurement, and/or any other suitable time compared to the sampling of the baseline measurement. For example, the baseline measurement is associated with a first time and the test measurement is associated with a second time. In examples, the difference between the first and second time can be 6 hours, 12 hours, 1 day, 1 week, 2 weeks, 1 month, 2 months, 4 months, 6 months, 1 year, 2 years, 5 years, 10 years, and/or any other time difference. The difference between the first and second time can optionally be greater than a threshold time difference, wherein the threshold time difference can be between 1 day-5 years or any range or value therebetween (e.g., 1 day, 1 week, 2 weeks, 1 month, 6 months, 1 year, 2 years, 5 years, etc.), but can alternatively be less than 1 day or greater than 1 year.

The baseline measurement and test measurement preferably represent (e.g., depict) the same geographic region, but can additionally or alternatively represent different geographic regions. The test measurement preferably encompasses substantially the same geographic extent as the baseline image, but can alternatively encompass more or less of the graphic extent as the baseline image.

However, the test representation for the geographic region can be otherwise determined.

Detecting a change S330 functions to detect occurrence of a rare change by comparing the baseline representation and the test representation. S330 is preferably performed after S310 and S320, but can alternatively be performed at any other time.

Figure 4D:
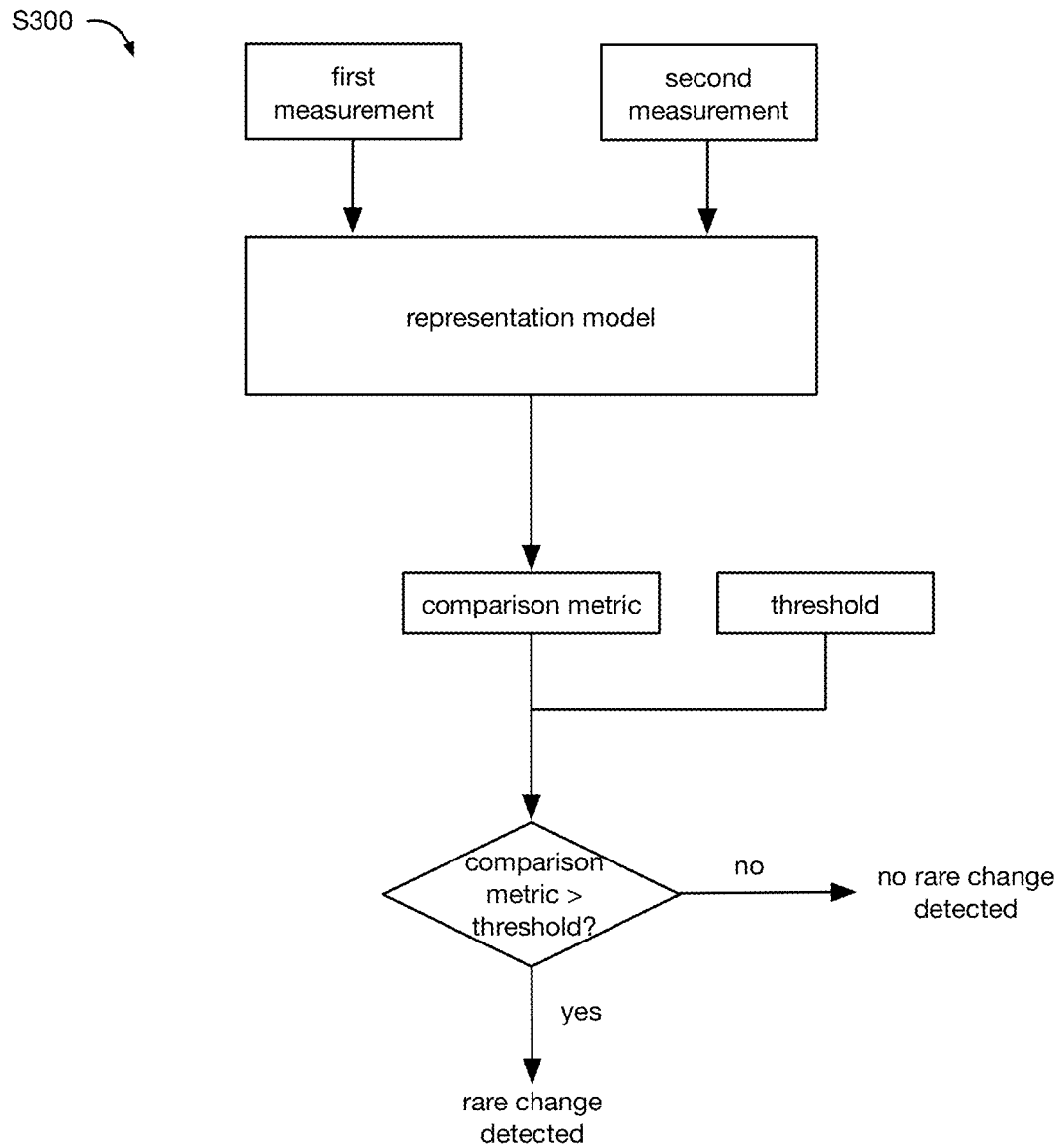
FIG. 4D is a third illustrative example of change detection using the representation model.

In a first variant, the rare change can be detected by determining a comparison metric between the baseline representation (e.g., vector) and the test representation (e.g., vector) extracted from the baseline measurement (e.g., image) and the test measurement (e.g., image) of the same geographic region by the trained representation model (e.g., examples shown in FIG. 4B and FIG. 4D). The comparison metric can be the same comparison metric used in S100 or a different comparison metric. The detection of the rare change occurrence can be the comparison metric and/or be based on the comparison metric. For example, since the trained representation model is trained to be agnostic to common changes (e.g., the trained representation model would output substantially the same representation for the same geographic region if no rare changes had been detected), a rare change can be detected when the baseline representation and the test representation do not match and/or differ beyond a threshold difference (e.g., a rare change threshold). A rare change can be detected when the comparison metric (e.g., absolute value of the comparison metric) is greater than a threshold (e.g., the same threshold used as the representation model training target and/or a different threshold). The threshold can be 0 and/or a value greater than 0 (e.g., 0.1, 0.2, 0.25, 0.5, 0.75, 1, 5, 10, 100, etc.). In an illustrative example, the comparison metric can be a cosine similarity (e.g., a number between 0 and 1) that measures the similarity between the baseline region representation and the test region representation that are represented as non-zero vectors. The rare change is detected if the cosine similarity is greater than the threshold (e.g., cosine similarity=0.8, threshold=0.5, 0.8>0.5). Otherwise, the rare change is not detected.

In a second variant, the rare change can be detected using a classifier. For example, the classifier can ingest the baseline representation and the test representation, and output a classification of "change" or "no change".

However, the change can be otherwise detected.

The method can optionally include characterizing the change S340, which functions to determine change information. Characterizing the change is preferably performed after the change has been detected in S330, but can alternatively be performed with change evaluation and/or at any other suitable time.

Characterizing the change can include determining a change type, a change description, a change extent, a change magnitude, a change uncertainty, and/or any other suitable change information.

In a first variant, characterizing the change can include determining a change type.

In a first example, the change type can be determined by using a change classification model (e.g., trained in S200). The change classification model ingests: the baseline representation and the test representation (e.g., separately or in a concatenated format), a comparison metric based on the baseline and test representations, the baseline measurement and the test measurement, and/or any other suitable inputs. The change classification model outputs the change type, a confidence score, and/or any other suitable information.

Figure 18:
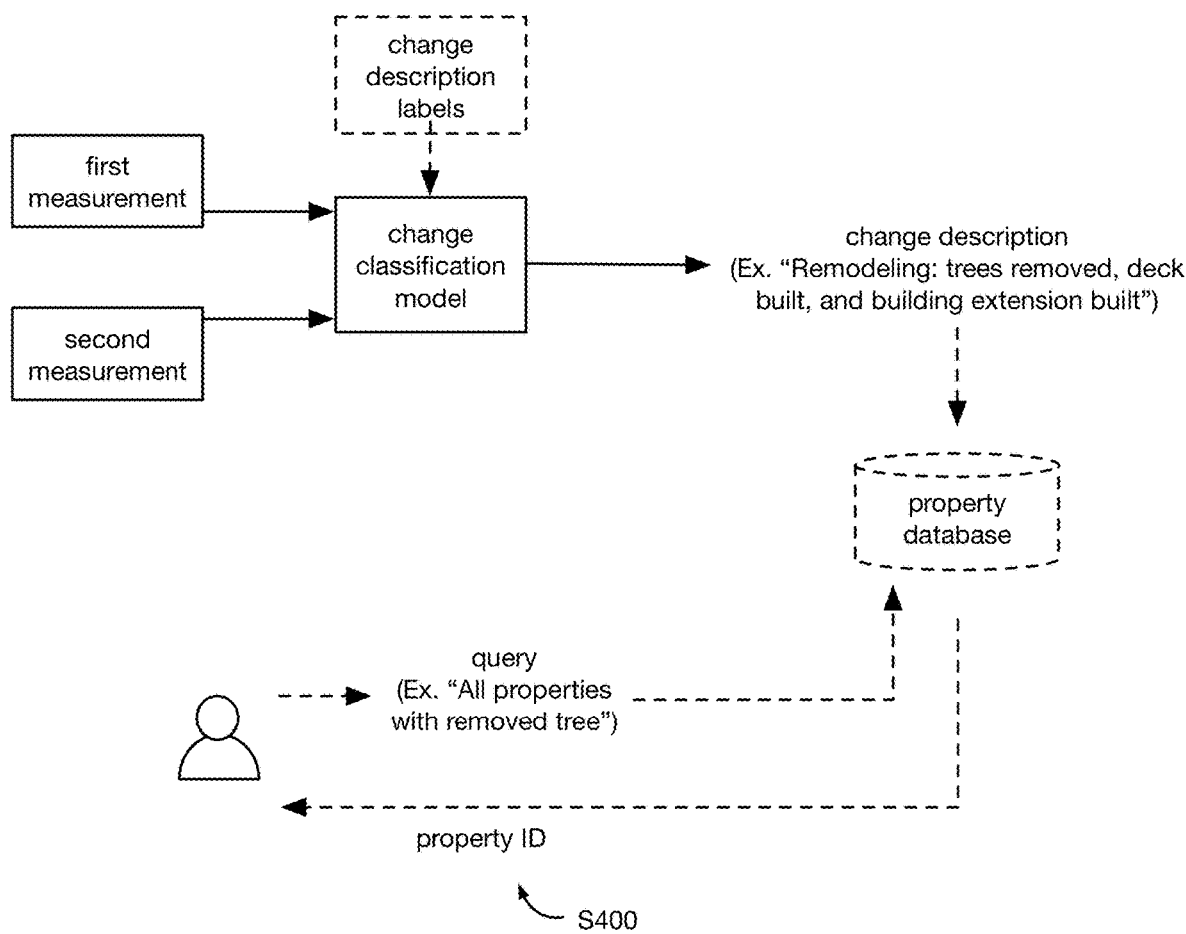
FIG. 18 is a first illustrative example of determining a change description.

In a second example, the change type can be determined by using a change classification model (e.g., trained CLIP model) that ingests a baseline measurement or representation and a test measurement or representation (e.g., separately or in a concatenated format) and outputs a change description. The resultant change description can optionally be searchable in a database; example shown in FIG. 18.

Figure 19A:
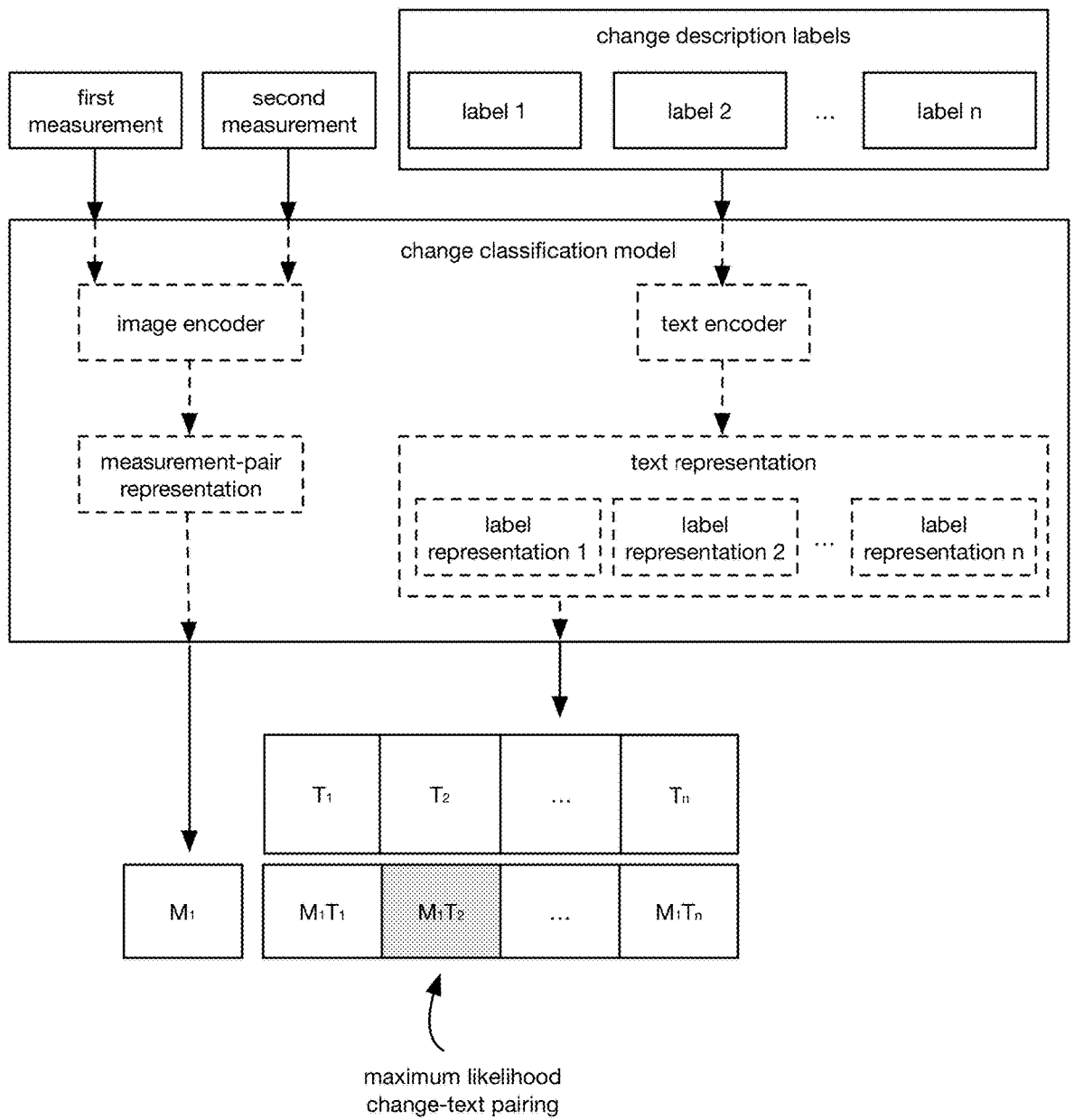
FIG. 19A is a second illustrative example of determining a change description.
Figure 19B:
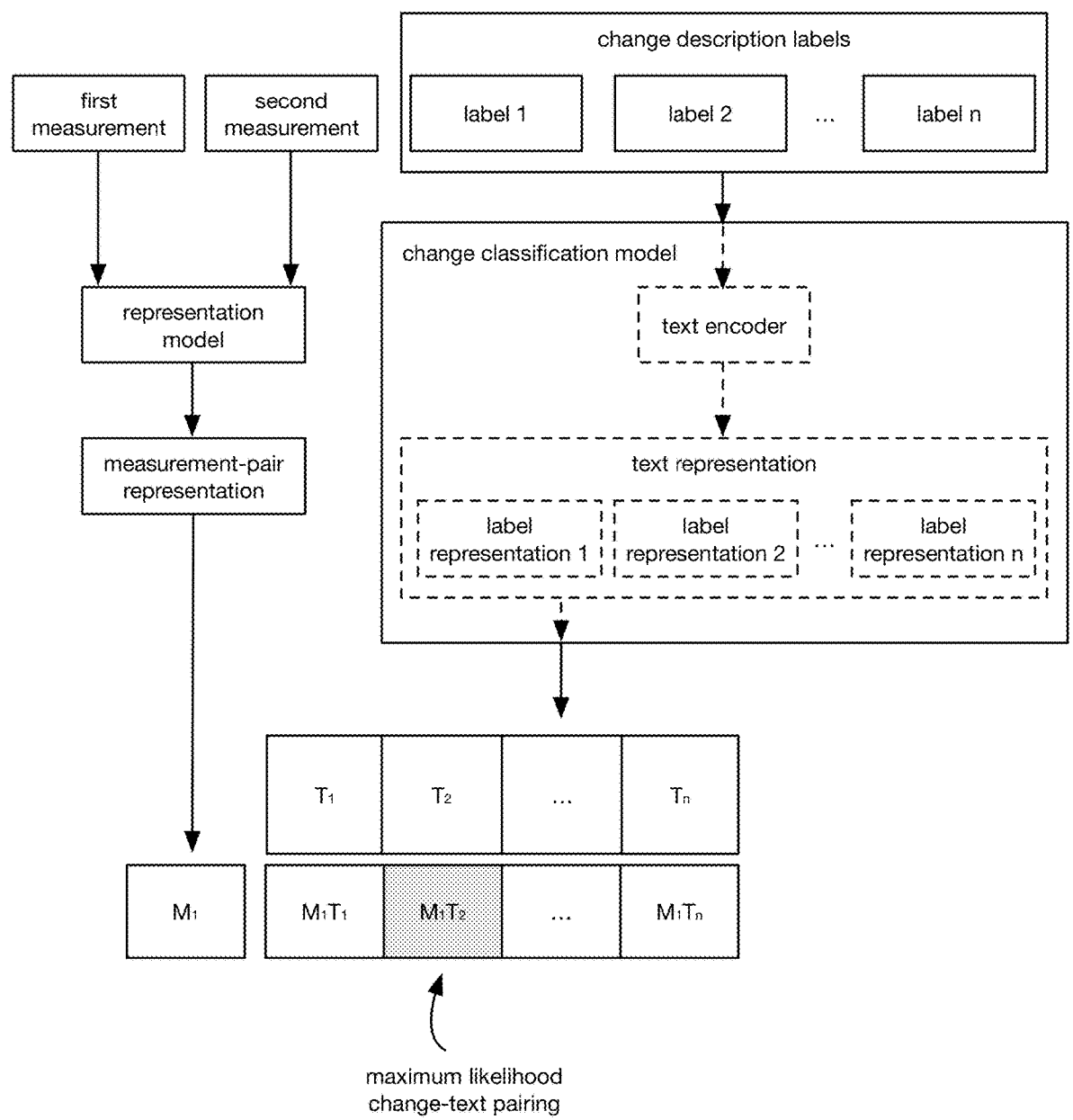
FIG. 19B is a third illustrative example of determining a change description.

In a third example, the change type can be determined by using a change classification model (e.g., trained CLIP model). In a first specific example, the change classification model ingests the baseline measurement, the test measurement, and a set of change descriptions, and outputs a measurement-pair representation and one or more text representations (e.g., wherein each text representation corresponds to a change description of the set of change descriptions); example shown in FIG. 19A. In a second specific example, the change classification model ingests a measurement-pair representation and/or a set of change descriptions, and the change classification model outputs one or more text representations (e.g., wherein each text representation corresponds to a change description of the set of change descriptions); example shown in FIG. 19B. The set of change descriptions is preferably determined by a user (e.g., includes the set of change descriptions that the user is looking for), but can additionally and/or alternatively be determined automatically, and/or otherwise determined. The set of change descriptions can be different from the change descriptions used in the training data to train the change classification model (e.g., S200), or can be the same change descriptions used in the training data to train the model. In a specific example, the change classification model can: determine (test) text representations of the set of (test) change descriptions, generate a measurement-pair representation (e.g., based on the test images), and/or generate a matrix (e.g., of size 1 by number of change descriptions within the set) relating the measurement-pair representation and the set of text representations ("change-text pair"). A comparison metric can be determined for each change-text pair, wherein the change description associated with the change-text pair having the best comparison metric (e.g., lowest value, highest value, etc.) is selected as the change type.

In a second variant, characterizing the change can include determining a change magnitude (e.g., scoring the change magnitude, binning the change magnitude, etc.). In a first example, the change magnitude can be determined by another trained model, given the baseline and test representations. In a second example, the change magnitude can be determined based on a comparison metric between the baseline representation and the test representation. The comparison metric can be the same comparison metric used in S100, the same comparison metric used in S200, the same comparison metric used in S3300, and/or a different comparison metric. The change magnitude can be the comparison metric and/or can be otherwise based on the comparison metric (e.g., determined using a model that outputs the magnitude based on the comparison metric).

A change uncertainty (e.g., uncertainty parameter, confidence interval, etc.) can optionally be determined based on the change classification model (e.g., an output of the change classification model), based on the comparison metric, and/or otherwise determined.

However, the change can be otherwise characterized.

Figure 10:
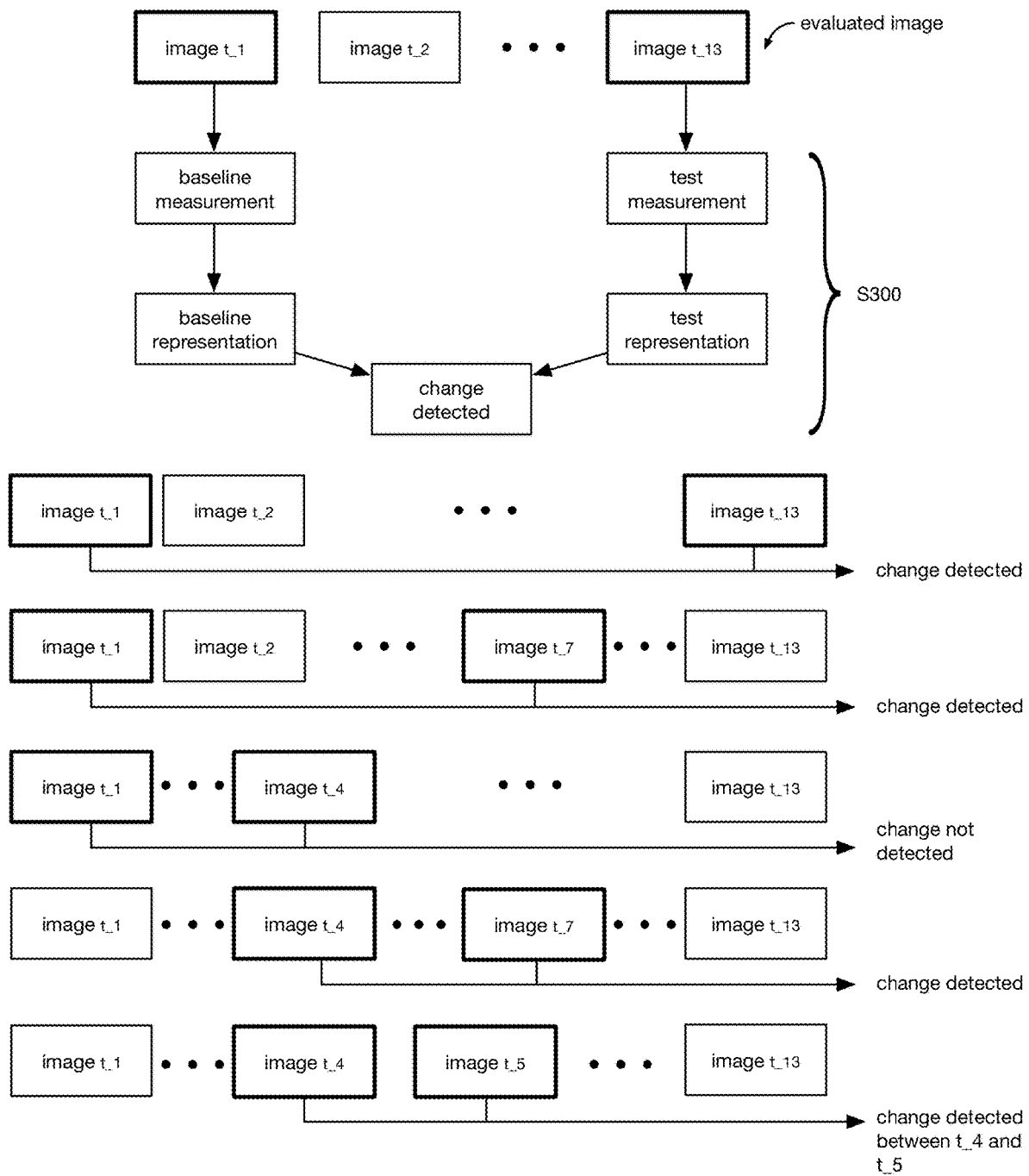
FIG. 10 is an illustrative example of determining a time change.

The method can optionally include determining a change time, which functions to estimate when a change occurred (e.g., determine the timeframe in which the change occurred). Determining a change time is preferably performed after the change has been detected in S330, but can alternatively be performed at any other suitable time. The change time can be a time stamp (e.g., second, minute, hour, day, date, year, quarter, season, etc.), a time step, a time window, and/or any other suitable temporal descriptor. In variants, the change time can be determined by searching through a timeseries of measurements and/or representations therefrom for the geographic region to identify the point at which the representation changed. Examples of search algorithms that can be used include: binary search (e.g., example shown in FIG. 10; iteratively evaluating for changes using pairwise comparisons, etc.), linear search, hashing search, and/or any other suitable algorithm. The search on the series of images can be performed backwards (e.g., from a current time), forwards (e.g., from a specified date of interest), and/or otherwise performed. The timeseries of measurements can be bounded by the baseline and test measurements, by randomly selected measurements, include images proximal a known change event (e.g., a known flood date, a known fire date, an insurance claim date, etc.), and/or include any other suitable set of images.

In a specific example, determining a change time includes identifying a series of measurements of the geographic region based on the respective measurement times (e.g., a series of measurements sorted by measurement time), setting the baseline measurement as the first measurement of the series of measurements, and setting the test measurement as the last measurement of the series of measurements. The change time can be determined by performing a binary search on the series of measurements (e.g., performing a binary search on a sorted list), repeating all or parts of S300 for every comparison between two measurements within the series of images, and/or otherwise determined. In an illustrative example, performing a binary search can include iteratively bisecting the series of measurements and repeating all or parts of S300 for the bisected series (e.g., for the baseline measurement and a measurement substantially halfway between the baseline and test measurements; for the test measurement and a measurement substantially halfway between the baseline and test measurements; etc.), thus iteratively narrowing the change time range (e.g., until the rare change is detected between two adjacent measurements).

However, the change time can be otherwise determined.

Providing the change functions to provide one or more change information elements (e.g., change type, change extent, change magnitude, change time, change cost, change occurrence, change description, change uncertainty, etc.) to an endpoint (e.g., physically an endpoint on a network, customer endpoint, user endpoint, automated valuation model system, etc.) through an interface. The interface can be a mobile application, web application, desktop application, an API, and/or any other suitable interface executing on a user device, gateway, and/or any other computing system. Providing the change can be based on the geographic region, based on the user request, and/or otherwise based.

Providing the change can additionally or alternatively include proving a comparison metric, a baseline representation or measurement, a test representation or measurement, a heat map, and/or any other suitable attribute describing the change.

In a first variant, providing the change can include presenting a visual display (e.g., numerical values, baseline measurement, test measurement, a heat map, etc.) to the user on a web application (e.g., native, browser, etc.). In a specific example, a change density map can be provided, wherein the change density is based on change information for each of a set of geographic regions (e.g., wherein a higher change density is associated with a higher regional density of change occurrence and/or a higher change magnitude). In a second variant, providing the change can include providing a text response (e.g., an API response, such as JSON, CSV, etc.).

However, the change can be otherwise provided.

However, the geographic region can be otherwise evaluated.

Determining a geographic region satisfying a change criterion S400 functions to identify one or more geographic regions associated with one or more elements of change information (e.g., a change type, change description, change time, change extent, etc.). S400 can be performed after S300 and/or at any other time. For example, S300 can be iteratively performed for each of a set of geographic regions, wherein S400 includes selecting a subset of the set of geographic regions based on the evaluation of each of the set of geographic regions.

Determining the geographic region can include selecting a subset of geographic regions from a set of geographic regions that satisfy one or more criteria. The set of geographic regions can include all geographic regions (e.g., in the database), a predetermined set of geographic regions, a manually defined set of geographic regions, geographic regions associated with one or more geographic region information (e.g., location, property class, etc.), geographic regions associated with a rare change (e.g., all geographic regions that have experienced a rare change), and/or otherwise determined. The subset of geographic regions can include all geographic regions that satisfy the criteria, a predetermined number of geographic regions (e.g., the 10 geographic regions that best satisfy the criteria), a predetermined percentage of the set of geographic regions, and/or any number of geographic regions. The criteria can be predetermined, manually determined, determined based on a user input (e.g., a query), and/or otherwise determined.

In a first variant, the criteria include detecting a rare change for the geographic region. In a second variant, the criteria include a change time associated with the geographic region matching a criteria change time (e.g., a specific time and/or a time range). In a third variant, the criteria include a change type associated with the geographic region matching a criteria change type and/or change description. In any variant, matching can include an exact match, a match within a threshold value (e.g., wherein the threshold value can be based on a change uncertainty parameter), and/or any other comparison.

S400 can optionally include providing the geographic region to an endpoint, which can function to provide one or more geographic regions to an endpoint through an interface. Providing the geographic region can be based on change information, based on a user request, and/or based on any other suitable input. However, the geographic region can be otherwise provided.

However, the geographic region can be otherwise determined.

6. Use Cases

All or portions of the methods described above can be used for automated property valuation, for insurance purposes, and/or otherwise used. For example, any of the outputs discussed above (e.g., for the geographic region) can be provided to an automated valuation model (AVM), which can predict a property value based on one or more of the attribute values (e.g., feature values), generated by the one or more models discussed above, and/or attribute value-associated information. The AVM can be: retrieved from a database, determined dynamically, and/or otherwise determined.

In variants, the rare changes can be used to determine: automated valuation model error, automated valuation model accuracy, automated property valuation or price, and/or any other suitable value. The rare changes can be used with: real estate property investing (e.g., identify underpriced properties that can increase in value through renovation and/or repairs; incorporate the rare change into a valuation model to establish the offer price; determine when construction, remodeling, and/or repairing has occurred; identify properties in portfolio that have suffered damage; etc.), real estate management (e.g., identify areas that can be renovated, repaired, added, and/or removed, etc.), real estate valuations (e.g., use rare change as an input to an automated valuation model; use rare change to detect error in property evaluation models; use rare change as a supplement to a property-level valuation report; etc.), real estate and loan trading (e.g., detect illegal builds; identify deterioration since prior due diligence was completed; incorporate the rare change into collateral valuation in mortgage origination and in secondary mortgage market; etc.), insurance underwriting (e.g., determine pricing of insurance depending on the rare change; optimize inspection to identify where to send inspectors; determine when to reach out to adjust insurance policy when remodeling is detected; identify which properties to initiate claims for; create opportunities to proactively address rare change issues before they result in insurance claims or other rare change-related losses; etc.); for customer target and/or acquisition (e.g., identify geographic regions where a product, such solar panels, has been widely adopted and target the remaining customers who haven't purchased the product residing in those geographic regions); for municipality management (e.g., identify unpermitted modifications of a property); identify which properties and/or geographic regions to run further analyses on; such as post-disaster analysis (e.g., search through only geographic regions where a rare change has been detected, determine a weather event impact on a geographic region, etc.), change identification (e.g., determine all geographic regions where a specific change has occurred, determine a change density map by analyzing each of a set of geographic regions, etc.), timeseries analysis (e.g., monitor a geographic region over time based on rare change type and/or magnitude of change; identify gentrification of a neighborhood; etc.), typicality analysis, and/or other analyses; and/or otherwise used.

In a first example, the method can be used to determine a weather event's impact on a region (e.g., a neighborhood, census block group, zip code, any other geographic region, etc.). In a first specific example, when rare changes are detected (e.g., with a change time substantially near a weather event time) for properties within the region (e.g., greater than a threshold percentage of properties within the region), a weather event impact can be determined based on the number and/or proportion of properties with a rare change, the change extent, the change magnitude, and/or any other change information for each of the properties. In a second specific example, when a rare change is detected for the region (e.g., based on aggregate representations across properties in the region, based on a representation for the region as a whole, etc.), a weather event impact can be determined based on the change occurrence, change extent, the change magnitude, and/or any other change information for the region.

Figure 21:
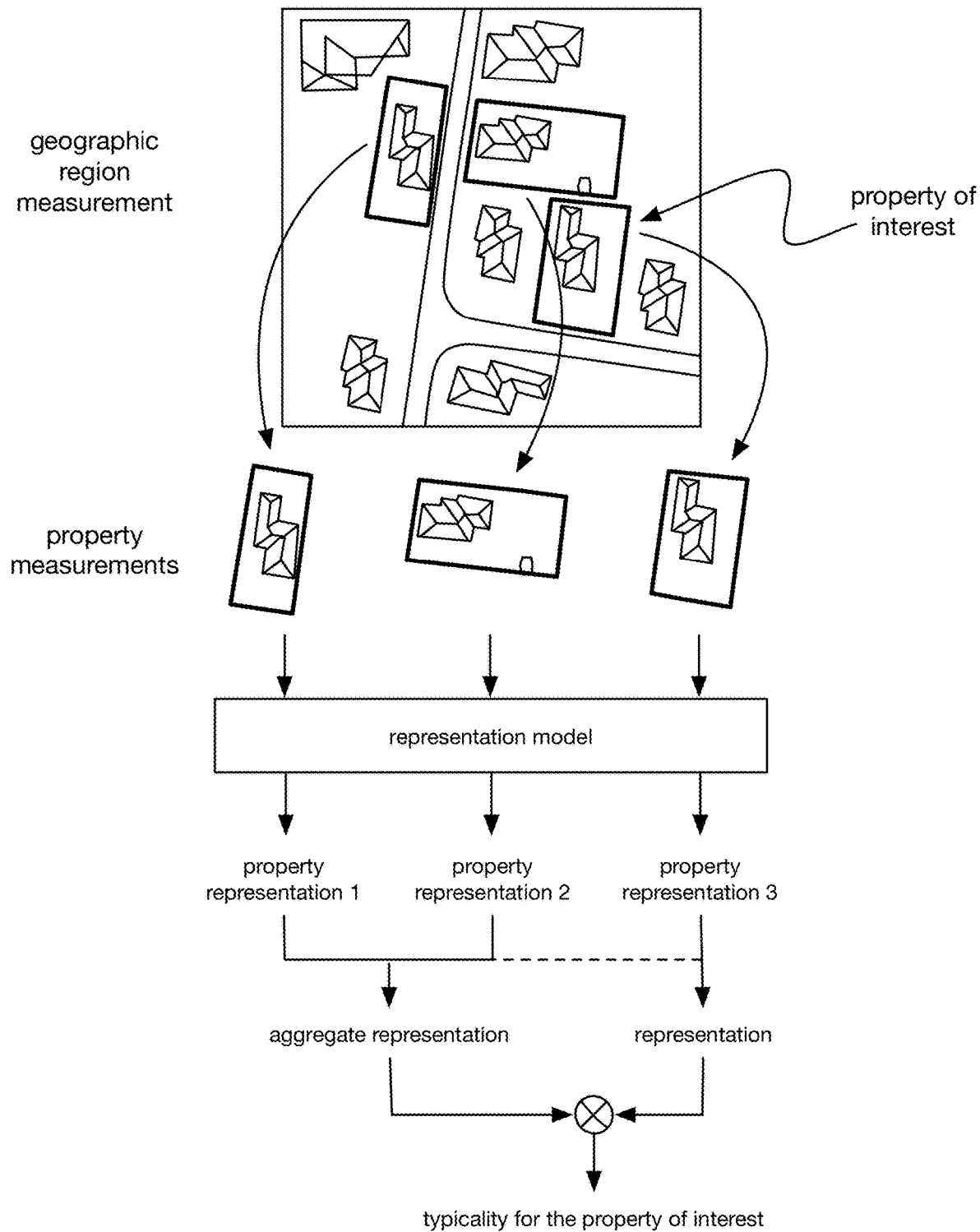
FIG. 21 is an illustrative example of determining a geographic region typicality.

In a second example, the method can be used to determine the typicality (e.g., similarity) for a geographic region of interest (e.g., example shown in FIG. 21). For example, the typicality can be determined based on a comparison metric between a first representation for a geographic region of interest determined using the trained representation model and a second representation (e.g., for a second geographic region, for an aggregate of a set of geographic regions such as neighboring geographic regions, etc.) determined using a trained representation model (e.g., the same or different representation model). In an illustrative example, the distance between a representation for a property relative to the representation for the set of reference properties can be indicative of the property's typicality relative to the reference property set. The reference property set can be: a neighborhood, market comparables, a census block group, and/or other reference properties. The representation for the reference property set can be aggregated from representations of individual properties within the reference property set (e.g., an average representation, median representation, etc.); be generated based on a reference property measurement (e.g., image of the neighborhood); and/or otherwise generated.

However, all or portions of the method can be otherwise used.

The method can optionally include determining interpretability and/or explainability of the trained model, wherein the identified features and/or attributes (and/or values thereof) can be provided to a user, used to identify errors in the data, used to identify ways of improving the model, and/or otherwise used. Interpretability and/or explainability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), information-theoretic model interpretation such as Learning to Explain (L2X), partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), Class Activation Maps (CAM), and/or any other suitable method and/or approach.

All or a portion of the models discussed above can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modelling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

As used herein, "substantially" or other words of approximation can be within a predetermined error threshold or tolerance of a metric, component, or other reference, and/or be otherwise interpreted.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   determining a first measurement and a second measurement of a geographic region;
   determining a first representation of the geographic region based on the first measurement using a representation model, wherein the representation model is trained to be agnostic to common changes;
   determining a second representation of the geographic region using the representation model; and
   detecting a rare change for the geographic region based on the first representation and the second representation.

2. The method of claim 1, wherein the representation model is trained to output substantially equivalent training representations based on different measurements of a training geographic region.

3. The method of claim 1, further comprising determining a distance between the first representation and the second representation, wherein the rare change is detected based on the distance.

4. The method of claim 1, wherein the representation model comprises an encoder trained using self-supervised learning.

5. The method of claim 1, wherein the first measurement and the second measurement correspond to a first time and a second time, respectively.

6. The method of claim 1, wherein the first measurement and the second measurement each comprise aerial images of the geographic region acquired at a first angle and a second angle, respectively.

7. The method of claim 1, further comprising classifying the rare change based on the first representation and the second representation, using a classification model.

* * * * *